United States Patent
Tang et al.

(10) Patent No.: US 10,637,904 B2
(45) Date of Patent: Apr. 28, 2020

(54) MULTIMEDIA STREAMING SERVICE PRESENTATION METHOD, RELATED APPARATUS, AND RELATED SYSTEM

(71) Applicant: Huawei Technologies Co., Ltd., Shenzhen, Guangdong (CN)

(72) Inventors: Tingfang Tang, Beijing (CN); Xin Wang, Shenzhen (CN); Shaobo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 15/675,082

(22) Filed: Aug. 11, 2017

(65) Prior Publication Data

US 2017/0339204 A1 Nov. 23, 2017

Related U.S. Application Data

(63) Continuation of application No. PCT/CN2015/072955, filed on Feb. 12, 2015.

(51) Int. Cl.
  *G06F 15/16* (2006.01)
  *H04L 29/06* (2006.01)
  (Continued)

(52) U.S. Cl.
  CPC ............ *H04L 65/601* (2013.01); *H04L 67/02* (2013.01); *H04N 5/45* (2013.01); *H04N 21/234* (2013.01);
  (Continued)

(58) Field of Classification Search
  None
  See application file for complete search history.

(56) References Cited

U.S. PATENT DOCUMENTS

2009/0158337 A1 6/2009 Stiers et al.
2011/0307581 A1 12/2011 Furbeck et al.
(Continued)

FOREIGN PATENT DOCUMENTS

CN 1254471 A 5/2000
CN 101778287 A 7/2010
(Continued)

OTHER PUBLICATIONS

3GPP TR 26.848 V1,7.0 (Aug. 2018), Technical Specification, 3rd Generation Partnership Project; Technical Specification Group Services and System Aspects; Multimedia Broadcast/Multicast Service (MBMS); Enhanced MBMS Operation (Release 12), 59 pages, XP050806180.

(Continued)

*Primary Examiner* — Padma Mundur
(74) *Attorney, Agent, or Firm* — Conley Rose, P.C.

(57) ABSTRACT

A multimedia streaming service presentation method based on Hypertext Transport Protocol streaming, a related apparatus, and a related system are provided. The multimedia streaming service presentation method based on HTTP streaming includes: obtaining a media presentation description file of a multi-stream multimedia streaming service i; obtaining n1 multimedia streams of N multimedia streams from a content server; presenting X presentation objects formed by the n1 multimedia streams; when a presentation object a of the X presentation objects is selected, obtaining a media presentation description file of a multimedia streaming service j that has an association relationship with the presentation object a; and obtaining m1 multimedia streams of M multimedia streams according to the media presentation description file of the multimedia streaming service j. The technical solutions provided in embodiments of the present application help better implement flexible switching between a multi-stream multimedia streaming service and another multimedia streaming service.

20 Claims, 8 Drawing Sheets

(51) Int. Cl.
*H04N 21/845* (2011.01)
*H04N 5/45* (2011.01)
*H04N 21/4725* (2011.01)
*H04N 21/262* (2011.01)
*H04N 21/431* (2011.01)
*H04N 21/2343* (2011.01)
*H04N 21/858* (2011.01)
*H04N 21/472* (2011.01)
*H04L 29/08* (2006.01)
*H04N 21/234* (2011.01)

(52) U.S. Cl.
CPC . *H04N 21/23439* (2013.01); *H04N 21/26258* (2013.01); *H04N 21/4314* (2013.01); *H04N 21/472* (2013.01); *H04N 21/4725* (2013.01); *H04N 21/8456* (2013.01); *H04N 21/8586* (2013.01)

(56) References Cited

U.S. PATENT DOCUMENTS

| | | | |
|---|---|---|---|
| 2012/0110138 A1 | 5/2012 | Zhang | |
| 2014/0006564 A1* | 1/2014 | Thang | H04L 65/601 709/219 |
| 2014/0089518 A1 | 3/2014 | Zhang et al. | |
| 2015/0327025 A1 | 11/2015 | Yamagishi | |
| 2016/0127790 A1* | 5/2016 | Szucs | H04N 21/482 725/52 |
| 2016/0156949 A1 | 6/2016 | Hattori et al. | |
| 2016/0373496 A1 | 12/2016 | Yamagishi | |

FOREIGN PATENT DOCUMENTS

| | | |
|---|---|---|
| CN | 102055773 A | 5/2011 |
| CN | 102421014 A | 4/2012 |
| CN | 103118272 A | 5/2013 |
| EP | 1021036 B1 | 11/2003 |
| EP | 3065407 A1 | 9/2016 |
| KR | 10-2014-0064978 A | 5/2014 |
| WO | 2014022017 A1 | 2/2014 |
| WO | 2014132821 A1 | 9/2014 |
| WO | 2015/001985 A1 | 1/2015 |
| WO | 2015/008775 A1 | 1/2015 |

OTHER PUBLICATIONS

Huawei Technologies Co. Ltd, "Mosaic Service of DASh over MBMS," Tdoc S4 (14)1233, TSG-SA4#81 meeting, Nov. 3-7, 2014, Santa Cruz, Tenerife, Spain, 5 pages, XP050895744.

Tokumo, Yasuaki, et al., "DASH: signaling the continuity of adaptation sets across periods," ISO/IEC JTC1/SC29/WG11, MPEG2014/M33112, Mar.-Apr. 4, 2014, Valencia, Spain, 9 pages, XP030061564.

Sony Europe Limited, "Mosaic service using DASH SRD,"S4-150195, 3GPP TSG-SA4 #82, Dubrovnik, Jan. 27, 2015, 8 pages, XP050963655.

International Standard ISO/IEC 23009-1, Second edition, May 15, 2014, Information technology—Dynamic adaptive streaming Over HTTP (DASH)—Part 1: Media presentation description and segment formats, 152 pages.

ISO/IEC JTC 1/SC 29 N14361, "Part 11: MPEG Composition Information," ISO/IEC DIS 23008-11DIS 23008-11, ISO/IEC JTC 1/SC 29/WG 11, Apr. 4, 2014, 44 pages.

Qualcomm Incorporated, "Several corrigenda issues for ISO/IEC 23009-1," ISO/IEC JTC1/SC29/WG11 MPEG2012/M28195, Geneva, Switzerland, Jan. 2013, 10 pages.

\* cited by examiner

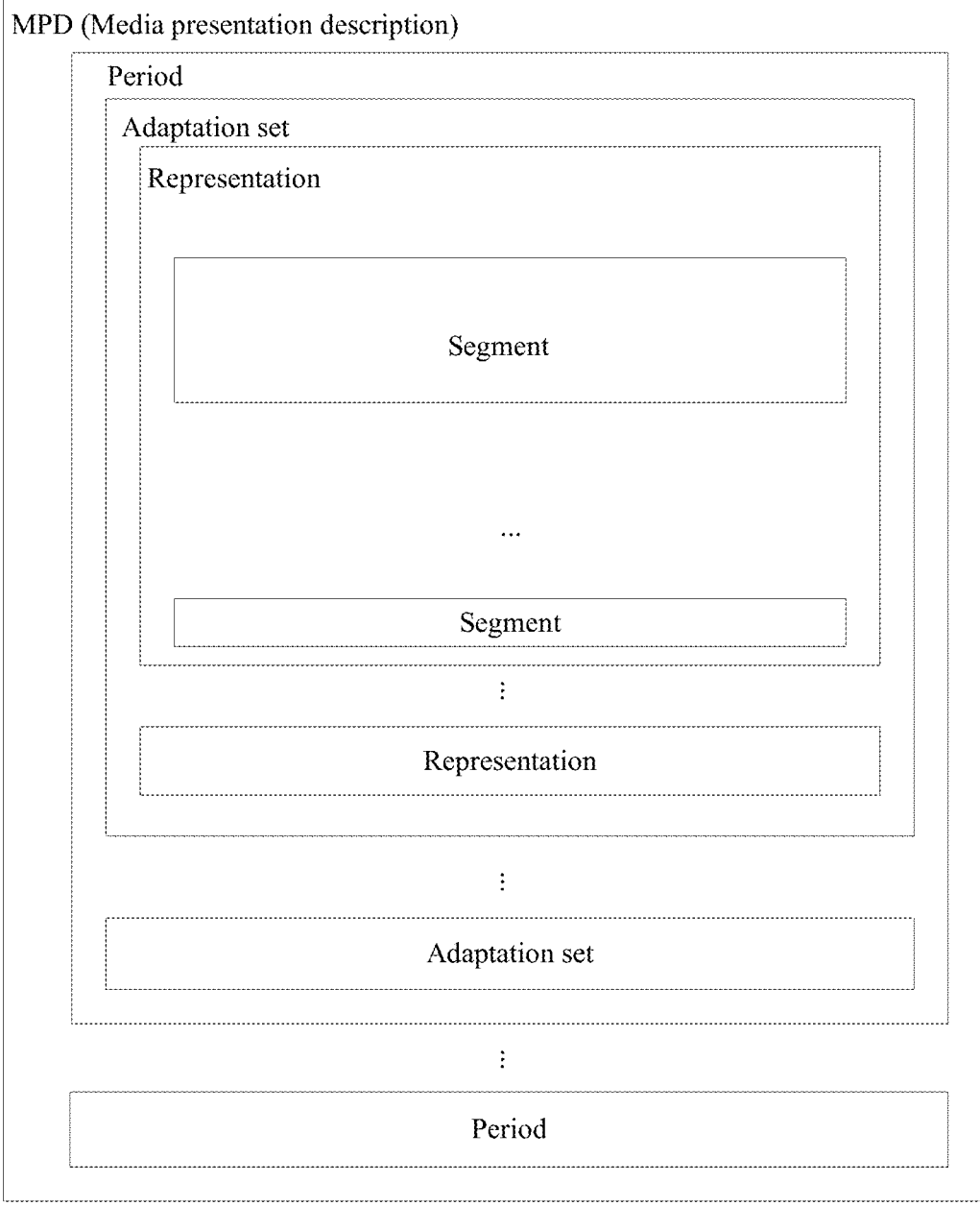
FIG. 1-a

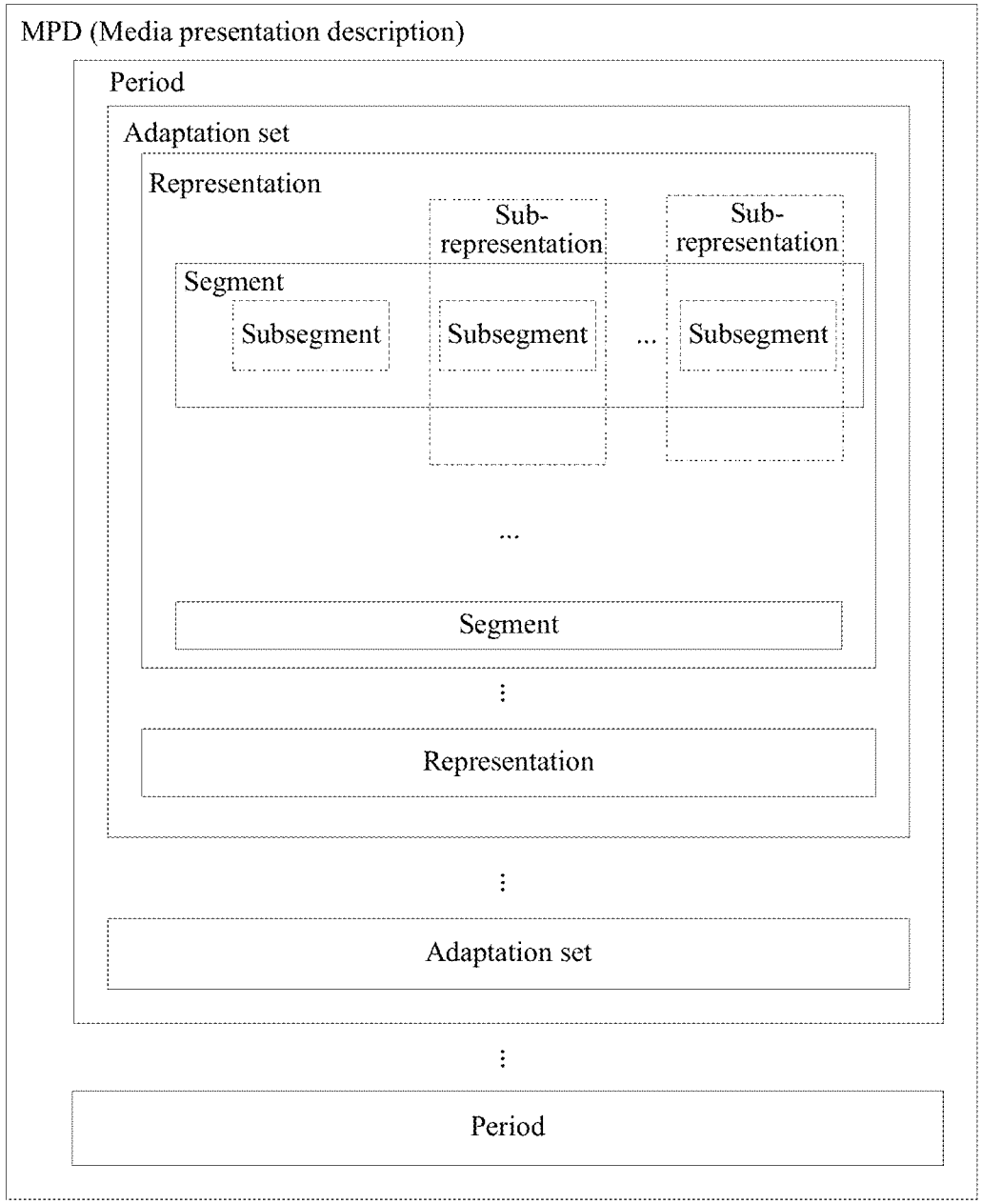
FIG. 1-b

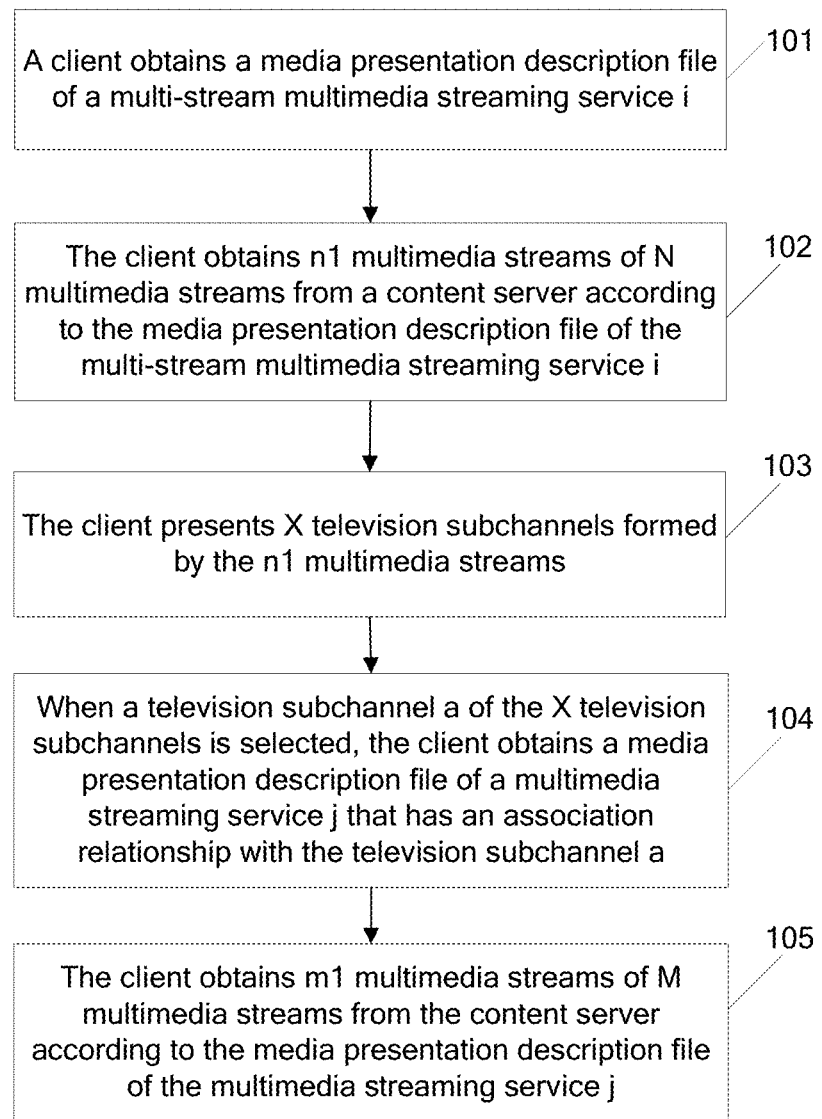
FIG. 1-c

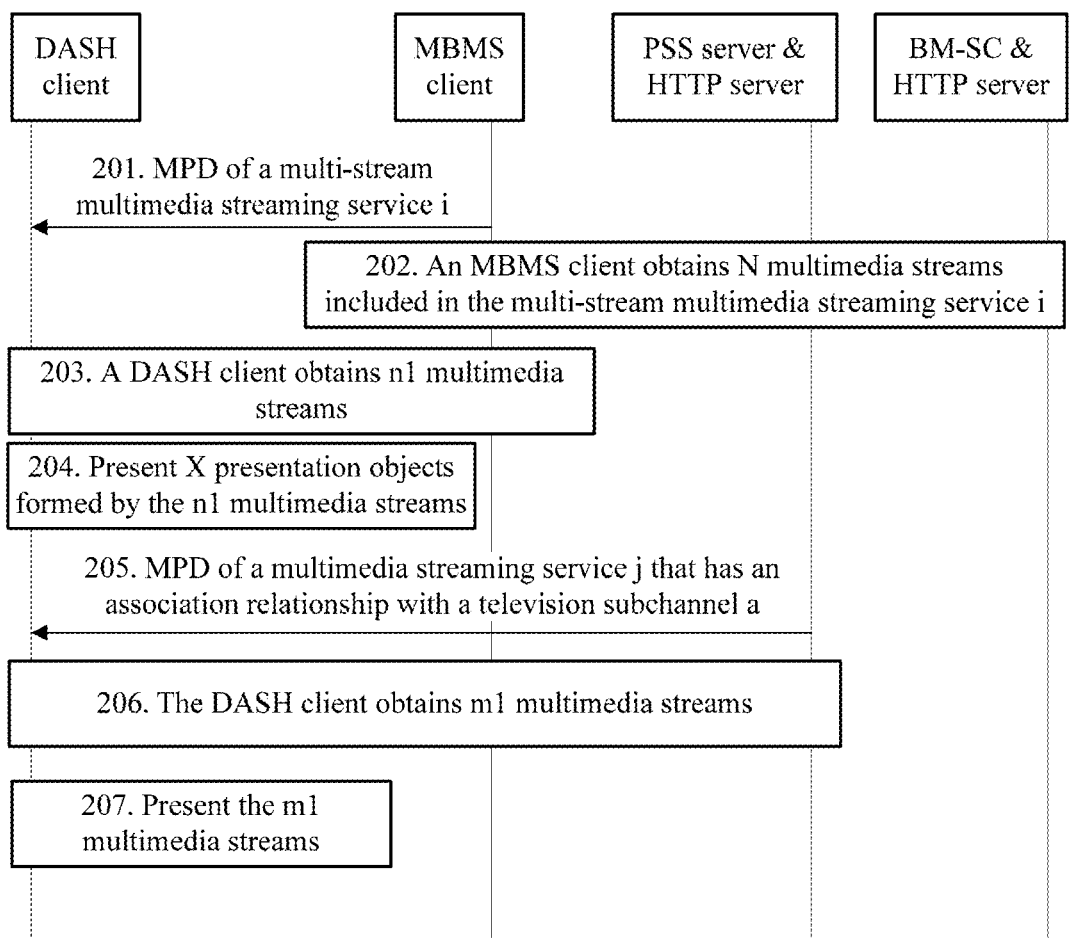
FIG. 2-a

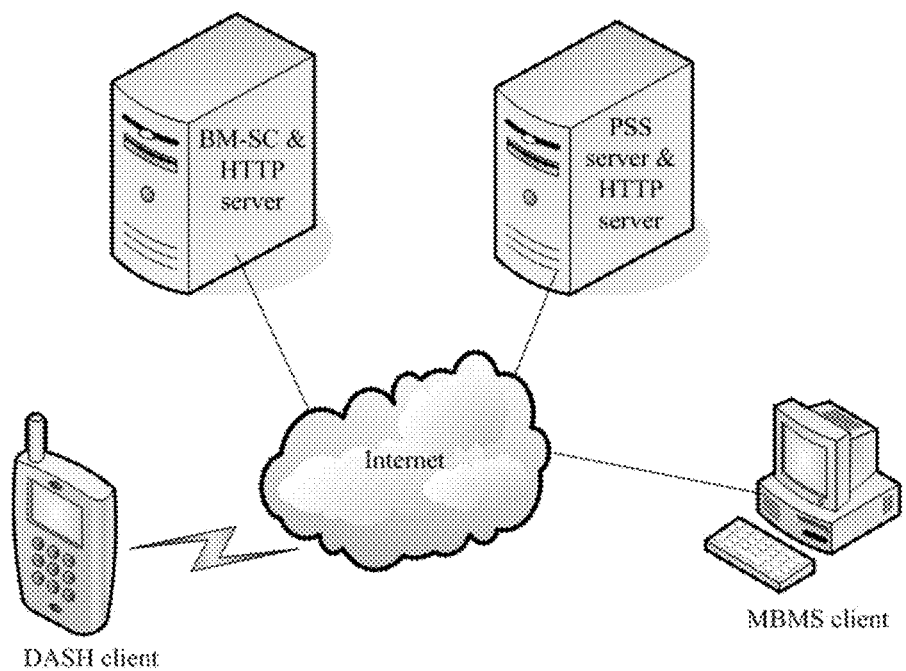
FIG. 2-b

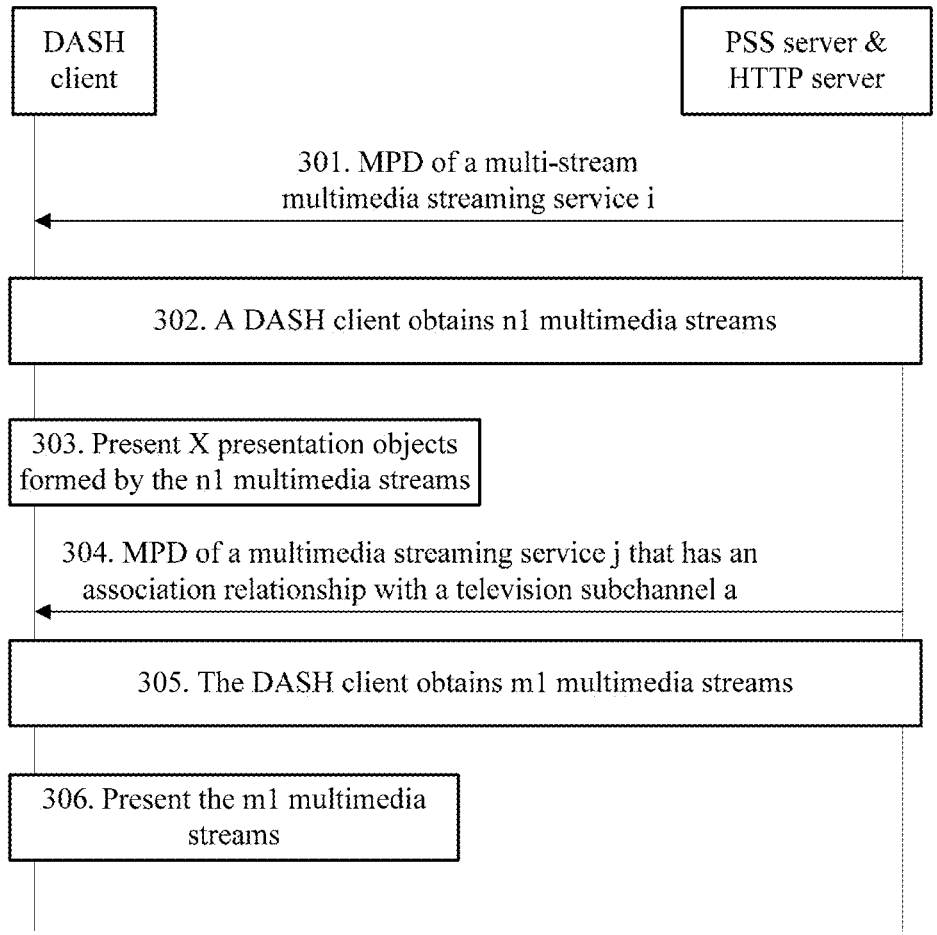
FIG. 3-a
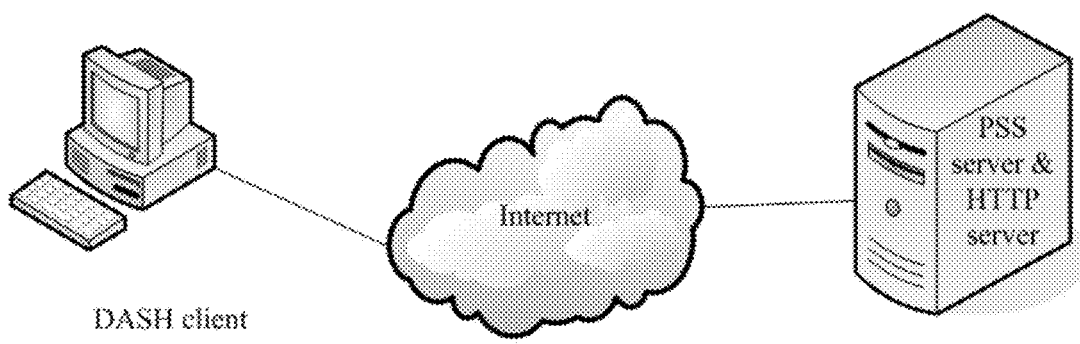
FIG. 3-b

MULTIMEDIA STREAMING SERVICE PRESENTATION METHOD, RELATED APPARATUS, AND RELATED SYSTEM

CROSS-REFERENCE TO RELATED APPLICATIONS

This application is a continuation of International Application No. PCT/CN2015/072955, filed on Feb. 12, 2015, the disclosure of which is hereby incorporated by reference in its entirety.

TECHNICAL FIELD

The present application relates to the field of communications technologies, and to a multimedia streaming service presentation method based on Hypertext Transfer Protocol streaming, a related apparatus, and a related system.

BACKGROUND

Multimedia streaming services based on Hypertext Transfer Protocol (HTTP) streaming are growing.

The mosaic service is an attractive service in Internet Protocol (IP) television and digital television. Mosaic is dividing a display screen into multiple logical presentation cells, and each of the logical presentation cells displays different content, for example, displays content of different television channels. The mosaic service is a quite interesting multimedia streaming service based on HTTP streaming.

At present, the international standard for HTTP streaming, specifically the Dynamic Adaptive Streaming over HTTP (DASH) standard, is being actively formulated. In addition, for example, the DASH over Multimedia Broadcast Multicast Service (MBMS) standard is also in lively discussion in 3GPP SA4. As one of multimedia streaming services, the mosaic service is also a scenario of discussion.

In conventional service scenarios of multimedia streaming based on HTTP streaming, it is generally difficult to enable flexible switching between a multi-stream multimedia streaming service and another multimedia streaming service. As a result, high-quality experience of users is greatly affected.

SUMMARY

Embodiments of the present application provide a multimedia streaming service presentation method based on Hypertext Transfer Protocol streaming, a related apparatus, and a related system, so as to better implement flexible switching between a multi-stream multimedia streaming service and another multimedia streaming service.

A first aspect of the embodiments of the present application provides a multimedia streaming service presentation method based on Hypertext Transfer Protocol HTTP streaming, including:

obtaining, by a client, a media presentation description file of a multi-stream multimedia streaming service i, where the media presentation description file of the multi-stream multimedia streaming service i describes N multimedia streams included in the multi-stream multimedia streaming service i, and N is an integer greater than 1;

obtaining, by the client, n1 multimedia streams of the N multimedia streams from a content server according to the media presentation description file of the multi-stream multimedia streaming service i;

presenting, by the client, X presentation objects formed by the n1 multimedia streams;

when a presentation object a of the X presentation objects is selected, obtaining, by the client, a media presentation description file of a multimedia streaming service j that has an association relationship with the presentation object a, where the media presentation description file of the multimedia streaming service j describes M multimedia streams included in the multimedia streaming service j, M and X are positive integers, and the association relationship between the presentation object a and the multimedia streaming service j is described by the media presentation description file of the multi-stream multimedia streaming service i; and obtaining, by the client, m1 multimedia streams of the M multimedia streams from the content server according to the media presentation description file of the multimedia streaming service j.

A second aspect of the embodiments of the present application provides a client, including:

a first obtaining unit, configured to obtain a media presentation description file of a multi-stream multimedia streaming service i, where the media presentation description file of the multi-stream multimedia streaming service i describes N multimedia streams included in the multi-stream multimedia streaming service i, N is an integer greater than 1, and an association relationship between the presentation object a and the multimedia streaming service j is described by the media presentation description file of the multi-stream multimedia streaming service i;

a second obtaining unit, configured to obtain n1 multimedia streams of the N multimedia streams from a content server according to the media presentation description file of the multi-stream multimedia streaming service i; and a presentation unit, configured to present X presentation objects formed by the n1 multimedia streams; where the first obtaining unit is further configured to: when a presentation object a of the X presentation objects is selected, obtain a media presentation description file of a multimedia streaming service j that has an association relationship with the presentation object a, where the media presentation description file of the multimedia streaming service j describes M multimedia streams included in the multimedia streaming service j, and M and X are positive integers; and the second obtaining unit is further configured to obtain m1 multimedia streams of the M multimedia streams from the content server according to the media presentation description file of the multimedia streaming service j.

A third aspect of the present application provides a client, including:

a processor and a memory, where the processor invokes code or an instruction in the memory to: obtain a media presentation description file of a multi-stream multimedia streaming service i, where the media presentation description file of the multi-stream multimedia streaming service i describes N multimedia streams included in the multi-stream multimedia streaming service i, and N is an integer greater than 1; obtain n1 multimedia streams of the N multimedia streams from a content server according to the media presentation description file of the multi-stream multimedia streaming service i; present X presentation objects formed by the n1 multimedia streams; when a presentation object a of the X presentation objects is selected, obtain a media presentation description file of a multimedia streaming service j that has an association relationship with the presentation object a, where the media presentation description file of the multimedia streaming service j describes M multimedia streams included in the multimedia streaming service j, M and X are positive integers, and the association relationship between the presentation object a and the multimedia streaming service j is described by the media presentation description file of the multi-stream multimedia streaming service i; and obtain m1 multimedia streams of the M multimedia streams from the content server according to the media presentation description file of the multimedia streaming service j.

A fourth aspect of the present application provides a communications system, including:

a client and a content server that is communicatively connected to the client, where the client is any client according to the embodiments of the present application.

It can be learnt that, in the technical solutions in the embodiments, the association relationship between the presentation object a and the multimedia streaming service j is introduced, which means that some level of association relationship between a multi-stream multimedia streaming service and another multimedia streaming service is introduced. Therefore, when the presentation object a of the X presentation objects is selected, the client can obtain the media presentation description file of the multimedia streaming service j that has an association relationship with the presentation object a, and the client can further obtain, from the content server according to the media presentation description file of the multimedia streaming service j, m1 multimedia streams of the M multimedia streams included in the multimedia streaming service j and present the m1 multimedia streams. It is obvious that the foregoing technical solutions help better implement flexible switching between a multi-stream multimedia streaming service and another multimedia streaming service, and therefore help improve user experience of an interactive multimedia streaming service.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

FIG. 1-*a* and FIG. 1-*b* are schematic diagrams of two data structures for media presentations based on DASH according to an embodiment of the present application;

FIG. 1-*c* is a schematic flowchart of a multimedia streaming service presentation method based on Hypertext Transfer Protocol streaming according to an embodiment of the present application;

FIG. 2-*a* is a schematic flowchart of another multimedia streaming service presentation method based on Hypertext Transfer Protocol streaming according to an embodiment of the present application;

FIG. 2-*b* is a schematic architectural diagram of a communications system according to an embodiment of the present application;

FIG. 3-*a* is a schematic flowchart of another multimedia streaming service presentation method based on Hypertext Transfer Protocol streaming according to an embodiment of the present application;

FIG. 3-*b* is a schematic architectural diagram of a communications system according to an embodiment of the present application;

DESCRIPTION OF EMBODIMENTS

Figure 4:
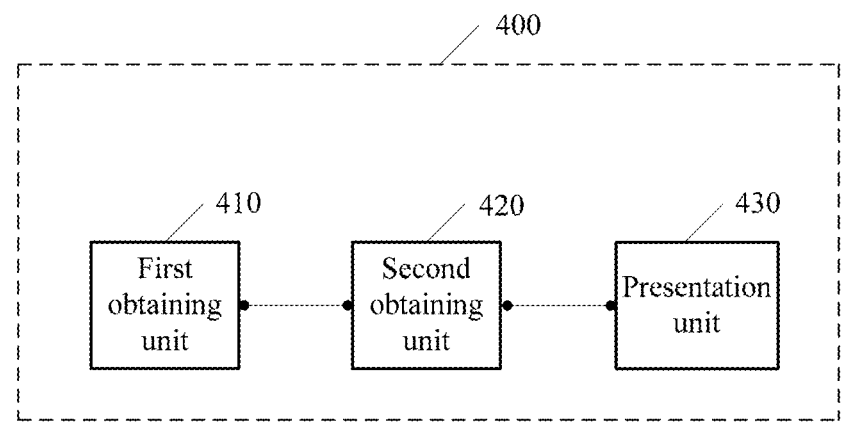
FIG. 4 is a schematic diagram of a client according to an embodiment of the present application.

Embodiments of the present application provide a multimedia streaming service presentation method based on Hypertext Transfer Protocol streaming, a related apparatus, and a related system, so as to better implement flexible switching between a multi-stream multimedia streaming service and another multimedia streaming service.

The following clearly describes the technical solutions in the embodiments of the present application with reference to the accompanying drawings in the embodiments of the present application. Apparently, the described embodiments are merely some but not all of the embodiments of the present application.

In the specification, claims, and accompanying drawings of the present application, the terms "first", "second", "third", "fourth", and so on are intended to distinguish between different objects but do not indicate a particular order. In addition, the terms "including", "containing", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

To help better understand the technical solutions in the embodiments of the present application, the following first describes some concepts of the technical solutions briefly.

DASH may be based on a hierarchical data model shown in FIG. 1-*a* or FIG. 1-*b*. A media presentation in DASH may be described by using a media presentation description file. The media presentation description file describes a series of periods that is based on time, and these periods may constitute a media presentation.

A period typically represents a media content period during which a consistent set of encoded versions of media content is available, that is, the set of bitrates, languages, captions, subtitles, and the like does not change during the period.

Within a period, content material may be arranged into adaptation sets. An adaptation set may represent a set of interchangeable encoded versions of one or more media content components. For example, there may be one adaptation set for a main video component and a separate adaptation set for a main audio component. If there is other content material available, for example, captions or audio descriptions, these may each have a corresponding separate adaptation set. Media material may also be provided in a multiplexed form, in which case, interchangeable versions of the multiplex may be described as a single adaptation set, for example, an adaptation set containing both a main audio and a main video for a period. Each multiplexed component may be described individually by a media content component description.

An adaptation set includes a set of representations. A representation describes a deliverable encoded version of one or more media content components. A representation may contain one or more multimedia streams (one for each media content component in the multiplex). Any single representation within an adaptation set is sufficient to render media content components contained in the adaptation set. Typically, clients may switch from one representation to another representation within an adaptation set in order to adapt to network conditions or other factors. Clients may also ignore representations that rely on codecs or rendering technologies they do not support or that are otherwise unsuitable.

Within a representation, content may be divided in time into segments. A corresponding uniform resource locator (URL) is provided for each segment, meaning that a segment is the largest unit of data that can be retrieved with a single HTTP request.

A media representation may be described by one or more MPD elements in a media presentation description (MPD) file.

In general, a media presentation may include a sequence composed of one or more periods (Period). Each period (Period) may include one or more adaptation sets. Each adaptation set includes one or more representations. Each representation may include zero, one, or more sub-representations, meaning that sub-representations are typically optional for a representation.

Each representation may include one or more segments (Segment). Each segment may include one or more subsegments.

Corresponding to the data structure of a media presentation, an MPD element in an MPD file may include, for example, one or more Period elements.

Each Period element may include one or more AdaptationSet elements.

Each AdaptationSet element may include one or more Representation elements. Each Representation element may include zero, one, or more SubRepresentation elements.

According to an embodiment of a multimedia streaming service presentation method based on HTTP streaming in the present application, the multimedia streaming service presentation method based on HTTP streaming includes: obtaining, by a client, a media presentation description (MPD) file of a multi-stream multimedia streaming service i, where the media presentation description file of the multi-stream multimedia streaming service i describes N multimedia streams included in the multi-stream multimedia streaming service i, and N is an integer greater than 1; obtaining, by the client, n1 multimedia streams of the N multimedia streams from a content server according to the media presentation description file of the multi-stream multimedia streaming service i; presenting, by the client, X presentation objects formed by the n1 multimedia streams; when a presentation object a of the X presentation objects is selected, obtaining, by the client, a media presentation description file of a multimedia streaming service j that has an association relationship with the presentation object a, where the media presentation description file of the multimedia streaming service j describes M multimedia streams included in the multimedia streaming service j, and M and X are positive integers; and obtaining, by the client, m1 multimedia streams of the M multimedia streams from the content server according to the media presentation description file of the multimedia streaming service j.

Referring to FIG. 1-c, FIG. 1-c is a schematic flowchart of a multimedia streaming service presentation method based on HTTP streaming according to an embodiment of the present application. As shown in FIG. 1-c, the multimedia streaming service presentation method based on HTTP streaming provided in this embodiment of the present application may include the following steps.

101. A client obtains a media presentation description file of a multi-stream multimedia streaming service i.

The media presentation description file of the multi-stream multimedia streaming service i describes N multimedia streams included in the multi-stream multimedia streaming service i. N is an integer greater than 1. N may be equal to, for example, 2, 3, 4, 5, 8, 11, 15, 20, 25, 30, or another value.

The client may be a DASH client or another client that incorporates a logical function of a DASH client.

The client may be, for example, a personal computer, a mobile phone, a tablet computer, a television set, or a set top box.

102. The client obtains n1 multimedia streams of N multimedia streams from a content server according to the media presentation description file of the multi-stream multimedia streaming service i.

n1 is a positive integer less than or equal to N.

n1 may be equal to, for example, 1, 2, 3, 4, 5, 8, 11, 15, 20, 25, 30, or another value.

103. The client presents X presentation objects formed by the n1 multimedia streams.

A presentation object may be a media presentation that can present integrated logic and that is formed by at least one multimedia stream and/or a part of at least one multimedia stream. The presentation object may be referred to as a television subchannel, subcontent, a television channel, or another name.

X is a positive integer less than, greater than, or equal to n1.

X may be equal to, for example, 1, 2, 3, 4, 5, 8, 11, 15, 20, 25, 30, or another value.

104. When a presentation object a of the X presentation objects is selected, the client obtains a media presentation description file of a multimedia streaming service j that has an association relationship with the presentation object a.

The media presentation description file of the multimedia streaming service j describes M multimedia streams included in the multimedia streaming service j.

The association relationship between the presentation object a and the multimedia streaming service j may be described by the media presentation description file of the multi-stream multimedia streaming service i.

The presentation object a may be a media presentation that can present integrated logic and that is formed by at least one multimedia stream of the n1 multimedia streams and/or a part of at least one multimedia stream of the n1 multimedia streams. The presentation object may be any presentation object of the X presentation objects.

A description of the presentation object (for example, a description of the presentation object a) may be corresponding to, for example, an extension element, an AdaptationSet element, a SubRepresentation element, or a Representation element.

The presentation object may be referred to as a television subchannel, subcontent, a television channel, or another name.

M is a positive integer.

The multimedia streaming service j may be a multi-stream multimedia streaming service or another multimedia streaming service.

M may be equal to, for example, 1, 2, 3, 4, 5, 8, 11, 15, 20, 25, 30, or another value.

105. The client obtains m1 multimedia streams of M multimedia streams from the content server according to the media presentation description file of the multimedia streaming service j.

m1 is a positive integer less than or equal to M.

m1 is equal to, for example, 1, 2, 3, 4, 5, 8, 11, 15, 20, 25, 30, or another value.

It can be learnt that, in the technical solution in this embodiment, the media presentation description file of the multi-stream multimedia streaming service i and the media presentation description file of the multimedia streaming service j are two different media presentation description files. This means that different multimedia streaming services each have a corresponding media presentation description file. The association relationship between the presentation object a and the multimedia streaming service j is introduced, which means that some level of association relationship between a multi-stream multimedia streaming service and another multimedia streaming service is introduced. Therefore, when the presentation object a of the X presentation objects is selected, the client can obtain the media presentation description file of the multimedia streaming service j that has an association relationship with the presentation object a, and the client can further obtain, from the content server according to the media presentation description file of the multimedia streaming service j, m1 multimedia streams of the M multimedia streams included in the multimedia streaming service j and present the m1 multimedia streams. It is obvious that the foregoing technical solution helps better implement flexible switching between a multi-stream multimedia streaming service and another multimedia streaming service, and therefore helps improve user experience of an interactive multimedia streaming service.

The association relationship between the presentation object a and the multimedia streaming service j may be described by the media presentation description file of the multi-stream multimedia streaming service i in many possible manners. A manner of describing the association relationship between the presentation object a and the multimedia streaming service j may be determined according to a specific scenario requirement.

Optionally, in some possible implementations of the present application, the association relationship between the presentation object a and the multimedia streaming service j may be described by a description element, corresponding to the presentation object a, in the media presentation description file of the multi-stream multimedia streaming service i.

Optionally, in some possible implementations of the present application, the association relationship between the presentation object a and the multimedia streaming service j is described by, for example, an extension element, corresponding to the presentation object a, in the media presentation description file of the multi-stream multimedia streaming service i. Alternatively, the association relationship between the presentation object a and the multimedia streaming service j may be described by an AdaptationSet element, corresponding to the presentation object a, in the media presentation description file of the multi-stream multimedia streaming service i. Alternatively, the association relationship between the presentation object a and the multimedia streaming service j may be described by a Representation element, corresponding to the presentation object a, in the media presentation description file of the multi-stream multimedia streaming service i. Alternatively, the association relationship between the presentation object a and the multimedia streaming service j is described by, for example, a SubRepresentation element, corresponding to the presentation object a, in the media presentation description file of the multi-stream multimedia streaming service i.

For example, the association relationship between the presentation object a and the multimedia streaming service j may be described by an association description element or an association description attribute in the AdaptationSet element, corresponding to the presentation object a, in the media presentation description file of the multi-stream multimedia streaming service i. Alternatively, the association relationship between the presentation object a and the multimedia streaming service j is described by an association description element or an association description attribute in the Representation element, corresponding to the presentation object a, in the media presentation description file of the multi-stream multimedia streaming service i. Alternatively, the association relationship between the presentation object a and the multimedia streaming service j is described by an association description element or an association description attribute in the SubRepresentation element, corresponding to the presentation object a, in the media presentation description file of the multi-stream multimedia streaming service i.

The association description element or the association description attribute may be an element or an attribute defined in a standard or a draft standard.

The association description element may be, for example, an XML linking language (XLink) element, and the association description attribute may be, for example, an XLink attribute. Alternatively, the association description element or the association description attribute may be an extension element (that is, a new element added as an extension) or an extension attribute (that is, a new attribute added as an extension attribute). The extension element or the extension element attribute may be different from the element or the attribute defined in the standard or the draft standard in terms of name, format and/or main function. If the association description element is an extension element, a specific name of the association description element used in an actual product is not limited herein. If the association description attribute is an extension attribute, a specific name of the association description attribute used in an actual product is not specifically limited herein.

Optionally, in some possible implementations of the present application, the association description element or the association description attribute describes the association relationship between the presentation object a and the multimedia streaming service j by describing an association relationship between the presentation object a and the media presentation description file of the multimedia streaming service j. Certainly, the association description element or the association description attribute may describe the association relationship between the presentation object a and the multimedia streaming service j in other manners.

Optionally, in some possible implementations of the present application, the association description element may include an attribute that carries an identifier of the media presentation description file of the multimedia streaming service j, or the association description attribute carries an identifier of the media presentation description file of the multimedia streaming service j.

The identifier of the media presentation description file may be, for example, a uniform resource locator (URL) of the media presentation description file or other information that can be used to locate the media presentation description file.

Optionally, in some possible implementations of the present application, the client may further present the m1 multimedia streams. The description element, corresponding to the presentation object a, in the media presentation description file of the multi-stream multimedia streaming service i further includes a continuity indication element or a continuity indication attribute; and when the continuity indication element or the continuity indication attribute indicates that presentation is performed in a manner of keeping temporal continuity, temporal continuity is kept between presentation of the m1 multimedia streams by the client and presentation of the presentation object a by the client. Certainly, keeping temporal continuity herein does not necessarily mean keeping temporal continuity in a strict sense, and, for example, may be keeping temporal continuity within a given tolerance.

The continuity indication element or the continuity indication attribute may be an element or an attribute defined in a standard or a draft standard. The continuity indication element may be, for example, an XLink element, and the continuity indication attribute may be, for example, an XLink attribute. Alternatively, the continuity indication element or the continuity indication attribute may be an extension element (that is, a new element added as an extension) or an extension attribute (that is, a new attribute added as an extension). The extension element or the extension attribute may be different from the element or the attribute defined in the standard or the draft standard in terms of name, format and/or main function. If the continuity indication element is an extension element, a specific name of the continuity indication element used in an actual product is not limited herein. If the continuity indication attribute is an extension attribute, a specific name of the continuity indication attribute used in an actual product is not limited herein.

For example, the continuity indication element or the continuity indication attribute may indicate that presentation is performed in a manner of keeping temporal continuity. When the continuity indication element or the continuity indication attribute indicates that presentation is performed in a manner of keeping temporal continuity, temporal continuity is kept between presentation of the m1 multimedia streams by the client and presentation of the presentation object a by the client.

For example, when the continuity indication element or the continuity indication attribute indicates that presentation is performed in a manner of keeping temporal continuity, the presenting the m1 multimedia streams by the client includes: presenting, by the client, the m1 multimedia streams from a start time point that is a time point when the presentation object a is selected. A specific time point for presenting the m1 multimedia streams may slightly vary according to a location of a random access point of the m1 multimedia streams. This depends on specific implementations.

Specifically, for example, when the continuity indication element or the continuity indication attribute indicates that presentation is performed in a manner of keeping temporal continuity, the presenting the m1 multimedia streams by the client includes: presenting, by the client, the m1 multimedia streams from a start time point that is a time point when presentation of the presentation object a is stopped. A specific time point for presenting the m1 multimedia streams may slightly vary according to a location of a random access point of the m1 multimedia streams. This depends on specific implementations.

For example, the continuity indication element is an XLink element, and a show attribute of the XLink element may indicate that presentation is performed in a manner of keeping temporal continuity.

For another example, an extension attribute continuation of the XLink element indicates that presentation is performed in a manner of keeping temporal continuity.

For still another example, the extension attribute xlink-Continuation indicates that presentation is performed in a manner of keeping temporal continuity.

Optionally, in some possible implementations of the present application, the description element, corresponding to the presentation object a, in the media presentation description file of the multi-stream multimedia streaming service i describes an association relationship between at least two multimedia streams associated with the presentation object a. The at least two multimedia streams associated with the presentation object a are multimedia streams of the N multimedia streams, that is, the at least two multimedia streams belong to the multi-stream multimedia streaming service i.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i may describe, for example, an association relationship between the multimedia stream p and the multimedia stream q by describing an association relationship between an adaptation set of the multimedia stream p and an adaptation set of the multimedia stream q.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a representation of the multimedia stream p.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a sub-representation of the multimedia stream p.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i describes an association relationship between the multimedia stream p and the multimedia stream q by describing an association relationship between a representation of the multimedia stream p and a sub-representation of the multimedia stream p.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i describes an association relationship between the multimedia stream p and the multimedia stream q by describing an association relationship between a sub-representation of the multimedia stream p and a sub-representation of the multimedia stream p.

Optionally, in some possible implementations of the present application, the at least two multimedia streams associated with the presentation object a include a multimedia stream p and a multimedia stream q. The description element, corresponding to the presentation object a, in the media presentation description file of the multi-stream multimedia streaming service i describes an association relationship between the multimedia stream p and the multimedia stream q by describing an association relationship between a representation of the multimedia stream p and a representation of the multimedia stream p.

It can be understood that the multimedia stream p and the multimedia stream q may be any two multimedia streams of the at least two multimedia streams associated with the presentation object a. For example, one of the multimedia stream p and the multimedia stream q may be a video stream, and the other may be an audio stream. For another example, one of the multimedia stream p and the multimedia stream q may be a video stream, and the other may be a subtitle stream.

Optionally, in some possible implementations of the present application, the association relationship between the at least two multimedia streams is described by the AdaptationSet element, corresponding to the presentation object a, in the media presentation description file of the multi-stream multimedia streaming service i; or the association relationship between the at least two multimedia streams may be described by the Representation element, corresponding to the presentation object a, in the media presentation description file of the multi-stream multimedia streaming service i; or the association relationship between the at least two multimedia streams may be described by the SubRepresentation element, corresponding to the presentation object a, in the media presentation description file of the multi-stream multimedia streaming service i.

Specifically, for example, the association relationship between the at least two multimedia streams may be described by an associationID element and an associationType element that are in the AdaptationSet element, corresponding to the presentation object a, in the media presentation description file of the multi-stream multimedia streaming service i.

Specifically, for another example, the association relationship between the at least two multimedia streams may be described by an associationID element and an associationType attribute that are in the AdaptationSet element, corresponding to the presentation object a, in the media presentation description file of the multi-stream multimedia streaming service i.

Specifically, for another example, the association relationship between the at least two multimedia streams may be described by an associationID attribute and an associationType element that are in the AdaptationSet element, corresponding to the presentation object a, in the media presentation description file of the multi-stream multimedia streaming service i.

Specifically, for another example, the association relationship between the at least two multimedia streams may be described by an associationID attribute and an associationType attribute that are in the AdaptationSet element, corresponding to the presentation object a, in the media presentation description file of the multi-stream multimedia streaming service i.

Specifically, for another example, the association relationship between the at least two multimedia streams may be described by an associationID element and an associationType element that are in the Representation element, corresponding to the presentation object a, in the media presentation description file of the multi-stream multimedia streaming service i.

Specifically, for another example, the association relationship between the at least two multimedia streams may be described by an associationID element and an associationType attribute that are in the Representation element, corresponding to the presentation object a, in the media presentation description file of the multi-stream multimedia streaming service i.

Specifically, for another example, the association relationship between the at least two multimedia streams may be described by an associationID attribute and an associationType element that are in the Representation element, corresponding to the presentation object a, in the media presentation description file of the multi-stream multimedia streaming service i.

Specifically, for another example, the association relationship between the at least two multimedia streams may be described by an associationID attribute and an associationType attribute that are in the Representation element, corresponding to the presentation object a, in the media presentation description file of the multi-stream multimedia streaming service i.

Specifically, for another example, the association relationship between the at least two multimedia streams may be described by an associationID element and an associationType element that are in the SubRepresentation element, corresponding to the presentation object a, in the media presentation description file of the multi-stream multimedia streaming service i.

Specifically, for another example, the association relationship between the at least two multimedia streams may be described by an associationID element and an associationType attribute that are in the SubRepresentation element, corresponding to the presentation object a, in the media presentation description file of the multi-stream multimedia streaming service i.

Specifically, for another example, the association relationship between the at least two multimedia streams may be described by an associationID attribute and an associationType element that are in the SubRepresentation element, corresponding to the presentation object a, in the media presentation description file of the multi-stream multimedia streaming service i.

Specifically, for another example, the association relationship between the at least two multimedia streams may be described by an associationID attribute and an associationType attribute that are in the SubRepresentation element, corresponding to the presentation object a, in the media presentation description file of the multi-stream multimedia streaming service i.

In some possible implementations of the present application, to describe an association relationship between a sub-representation and another object, for example, a sub-representation identifier may be added to a definition of the SubRepresentation element, and the sub-representation identifier is used to describe the association relationship between the sub-representation and the another object. For example, when an associationID attribute and an associationType attribute are used to describe the association relationship between the sub-representation and the another object, a value of the associationID attribute may include the sub-representation identifier, that is, the associationID attribute may carry the sub-representation identifier and other information.

The foregoing example is mainly intended to describe that the association relationship between the at least two multimedia streams associated with the presentation object a may be reflected by an association relationship between two objects at a same level, or may be reflected by an association relationship between two objects at different levels.

It can be learnt that multiple manners are provided as examples in this embodiment to associate at least two multimedia streams associated with the presentation object a, and the at least two multimedia streams belong to the multi-stream multimedia streaming service i. That is, the foregoing example solutions provide multiple implementations how multimedia streams in one multi-stream multimedia streaming service are associated. Therefore, multimedia streams in one multi-stream multimedia streaming service can be flexibly associated. There may be many advantages to flexibly associate multimedia streams in one multi-stream multimedia streaming service. For example, a navigation screen includes multiple logical presentation cells; when a focus currently stays with a logical presentation cell (in which case the logical presentation cell may be in a highlighted state), the client may present an audio stream that has an association relationship with a video stream presented by the logical presentation cell with which the focus currently stays. When the focus moves to another logical presentation cell (in which case the other logical presentation cell may be in a highlighted state), the client may present an audio steam that has an association relationship with a video stream presented by the other logical presentation cell with which the focus currently stays. For another example, when the focus currently stays with a logical presentation cell (in which case the logical presentation cell may be in a highlighted state), the client may present a subtitle stream that has an association relationship with a video stream presented by the logical presentation cell with which the focus currently stays. When the focus moves to another logical presentation cell (in which case the other logical presentation cell may be in a highlighted state), the client may present a subtitle stream that has an association relationship with a video stream presented by the other logical presentation cell with which the focus currently stays.

To help better understand and implement the foregoing solutions in this embodiment of the present application, the following provides descriptions using examples with reference to some specific application scenarios.

Referring to FIG. 2-a and FIG. 2-b, FIG. 2-a is a schematic flowchart of a multimedia streaming service presentation method based on HTTP streaming according to another embodiment of the present application. The multimedia streaming service presentation method based on HTTP streaming shown in FIG. 2-a may be specifically implemented based on a network architecture shown in FIG. 2-b.

The network architecture shown in FIG. 2-b mainly includes a DASH client, a Multimedia Broadcast Multicast Service (MBMS) client, a broadcast/multicast service center (BM-SC & HTTP Server), a Packet-Switched Streaming Service server (PSS server & HTTP server), and the like. The BM-SC & HTTP server is a broadcast/multicast service server that incorporates an HTTP server function. The PSS server & HTTP server is a Packet-Switched Streaming Service server that incorporates an HTTP server function.

As shown in FIG. 2-a, the multimedia streaming service presentation method based on HTTP streaming according to the other embodiment of the present application may include the following steps.

201. The DASH client obtains a media presentation description file (MPD) of a multi-stream multimedia streaming service i.

The multi-stream multimedia streaming service i may be, for example, a mosaic service or a multi-stream multimedia streaming service of another type.

The media presentation description file of the multi-stream multimedia streaming service i describes N multimedia streams included in the multi-stream multimedia streaming service i. N is an integer greater than 1. N may be equal to, for example, 2, 3, 4, 5, 8, 11, 15, 20, 25, 30, or another value.

202. The MBMS client obtains, from the BM-SC & HTTP server, N multimedia streams included in the multi-stream multimedia streaming service i.

The MBMS client may obtain, from the BM-SC & HTTP server, the N multimedia streams included in the multi-stream multimedia streaming service i in a form of DASH segments. The DASH segments of the N multimedia streams may be transmitted, as FLUTE objects, to the MBMS client.

203. The DASH client requests n1 multimedia streams of the N multimedia streams from the MBMS client according to the MPD of the multi-stream multimedia streaming service i.

The DASH client may obtain the n1 multimedia streams of the N multimedia streams from the MBMS client in a form of DASH segments.

204. The DASH client presents X presentation objects formed by the n1 multimedia streams.

The n1 multimedia streams may include a video stream, a subtitle stream, an audio stream, and the like.

The DASH client may present the X presentation objects respectively in X logical presentation cells. The X logical presentation cells and the X presentation objects may be in a one-to-one correspondence. A presentation object of the X presentation objects may be formed by one or more multimedia streams of the n1 multimedia streams, for example, may be formed by one video stream or one audio stream, may be formed by one video stream and one subtitle stream, or may be formed by one video stream, one subtitle stream, and one audio stream.

Optionally, in some possible implementations of the present application, a description element, corresponding to a presentation object a, in the media presentation description file of the multi-stream multimedia streaming service i describes an association relationship between at least two multimedia streams associated with the presentation object a. The at least two multimedia streams associated with the presentation object a are multimedia streams of the N multimedia streams, that is, the at least two multimedia streams belong to the multi-stream multimedia streaming service i. For some specific implementations of describing, by the media presentation description file of the multi-stream multimedia streaming service i, the association relationship between the at least two multimedia streams associated with the presentation object a, reference may be made to related descriptions in the foregoing embodiment. Details are not described herein again.

It can be learnt that multiple manners are provided as examples in this embodiment of the present application to associate at least two multimedia streams associated with the presentation object a, and the at least two multimedia streams belong to the multi-stream multimedia streaming service i. That is, the foregoing example solutions provide multiple implementations how multimedia streams in one multi-stream multimedia streaming service are associated. Therefore, multimedia streams in one multi-stream multimedia streaming service can be associated flexibly. There may be many advantages to flexibly associate multimedia streams in one multi-stream multimedia streaming service.

For a logical presentation cell with which a focus stays (the logical presentation cell with which the focus stays may be, for example, in a highlighted state), the DASH client may further present an audio stream corresponding to a video stream presented by the logical presentation cell.

During a process of viewing the X presentation objects by a user, the user may control the focus to move between logical presentation cells, that is, a highlighted logical presentation cell may change. The DASH client may obtain, according to a description of the media presentation description file of the multi-stream multimedia streaming service i, an audio stream associated with a video stream presented by the highlighted logical presentation cell, and present the audio stream associated with the video stream presented by the highlighted logical presentation cell. Alternatively, the DASH client may obtain, according to a description of the media presentation description file of the multi-stream multimedia streaming service i, all audio and video streams included in the multi-stream multimedia streaming service i, but, as to an audio stream presentation manner, the DASH client may present only an audio stream associated with a video stream presented by a highlighted logical presentation cell.

205. When a presentation object a of the X presentation objects is selected (for example, a user double-clicks a logical presentation cell corresponding to the presentation object a), the DASH client obtains, according to a description of the media presentation description file of the multi-stream multimedia streaming service i, a media presentation description file of a multimedia streaming service j that has an association relationship with the presentation object a.

The association relationship between the presentation object a and the multimedia streaming service j may be described by the media presentation description file of the multi-stream multimedia streaming service i in many possible manners. A manner of describing the association relationship between the presentation object a and the multimedia streaming service j may be determined according to a specific scenario requirement. For some specific implementations of describing, by the media presentation description file of the multi-stream multimedia streaming service i, the association relationship between the presentation object a and the multimedia streaming service j, reference may be made to related descriptions in the foregoing embodiment. Details are not described herein again.

206. The DASH client obtains m1 multimedia streams of the M multimedia streams from the PSS server & HTTP server according to the MPD of the multimedia streaming service j.

207. The DASH client presents the m1 multimedia streams.

The m1 multimedia streams may include a video stream, an audio stream, a subtitle stream, and the like.

Optionally, in some possible implementations of the present application, when the description element, corresponding to the presentation object a, in the media presentation description file of the multi-stream multimedia streaming service i further indicates that the DASH client performs presentation in a manner of keeping temporal continuity, temporal continuity may be kept between presentation of the m1 multimedia streams by the DASH client and presentation of the presentation object a by the DASH client. Certainly, keeping temporal continuity herein does not necessarily mean keeping temporal continuity in a strict sense, and may be keeping temporal continuity within a given tolerance.

For example, an XLink element may indicate that the DASH client performs presentation in a manner of keeping temporal continuity. When the XLink element indicates that the DASH client performs presentation in a manner of keeping temporal continuity, temporal continuity is kept between presentation of the m1 multimedia streams by the DASH client and presentation of the presentation object a by the DASH client.

Specifically, for example, when the XLink element indicates that the DASH client performs presentation in a manner of keeping temporal continuity, the presenting the m1 multimedia streams by the DASH client includes: presenting, by the DASH client, the m1 multimedia streams from a start time point that is a time point when the presentation object a is selected.

Specifically, for example, when the XLink element indicates that the DASH client performs presentation in a manner of keeping temporal continuity, the presenting the m1 multimedia streams by the DASH client includes: presenting, by the DASH client, the m1 multimedia streams from a start time point that is a time point when presentation of the presentation object a is stopped.

For example, a show attribute of the XLink element may indicate that the DASH client performs presentation in a manner of keeping temporal continuity.

For example, xlink:show="continue" may indicate that presentation is performed in a manner of keeping temporal continuity. This is equivalent to a value extension of xlink:show, that is, a new value is added for xlink:show.

For another example, xlink:show="other", and description information, such as continuation, of an associated service to which XLink points is added, where continuation is an XLink attribute or not an XLink attribute. For example, xlink:continuation="true" or xlinkContinuation="true" may indicate that presentation is performed in manner of keeping temporal continuity, that is, indicate that temporal continuity is kept when the client switches from an original multimedia streaming service to an associated multimedia streaming service.

For example, if playback of an original multimedia streaming service currently stops at a time point A, after switching to an associated multimedia streaming service, the client may continue to decode and present a corresponding media stream from the time point A.

In addition, for switching from the multi-stream multimedia streaming service i to the associated multimedia streaming service, the MPD may alternatively indicate that temporal continuity does not need to be kept between the multi-stream multimedia streaming service i and the associated multimedia streaming service j, that is, the associated multimedia streaming service j may be presented from the start as a new service.

In this case, for example, xlink:show="replace"/"new"/"other". This extends usage of XLink in the DASH standard and incorporates attribute values defined in W3C. Herein, replace indicates that an associated multimedia streaming service replaces an original multimedia streaming service in an original service window for presentation, and new indicates that an associated multimedia streaming service is presented in a new window. When a value is replace or new, switching to an associated multimedia streaming service is performed, and presentation of a current multimedia streaming service is stopped. If presentation of the current multimedia streaming service continues, but it is specified that, at the time of switching from the multi-stream multimedia streaming service i to the associated multimedia streaming service, temporal continuity does not need to be kept between the multi-stream multimedia streaming service and the associated multimedia streaming service, it may be only necessary to present the associated multimedia streaming service from the start as a new service. Description information continuation of an associated multimedia streaming service to which XLink points may be added. For example, xlink:continuation="false" or xlinkContinuation="false" indicates that temporal continuity does not need to be kept when the DASH client switches from an original multimedia streaming service to an associated multimedia streaming service.

The solution of this embodiment is mainly based on the DASH over MBMS draft standard. The MBMS client obtains, in a broadcast environment, a DASH segment of a media stream included in the multi-stream multimedia streaming service i, and the DASH client may request the corresponding DASH segment from the MBMS client by using an HTTP interface. Specific presentation and related service logic may be processed by the DASH client. The MBMS client may add, by matching a basePattern attribute in a deliveryMethod element of a user service description (USD) and a URL in a segment request initiated by the DASH client, the corresponding segment in a corresponding message sent to the DASH client.

A procedure for obtaining a DASH segment by the MBMS client by means of broadcast (broadcast) may be the same as a conventional broadcast download procedure. During MPD downloading or updating, or downloading of any resource in an MPD, matching is performed between basePattern in the deliveryMethod element of the USD, content-location in an FDT of a FLUTE, and a related URL in the MPD. That is, the three parameters point to a same object. When a user chooses to switch from the multi-stream multimedia streaming service i (for example, a mosaic service) to a specified television channel program, the DASH client obtains an MPD of the specified television channel program, and obtains a media segment of the program from the server in a unicast mode. After receiving the MPD of the selected television channel program, the DASH client may automatically exit presentation of the multi-stream multimedia streaming service i and switch to the selected television channel program. When the DASH client requests media content of a specified television channel program, switching from the unicast mode to a multicast mode may occur. After a quantity of users who select the television channel exceeds a given quantity, the server may transmit corresponding television channel program content by means of broadcast, where the television channel program has corresponding USD and MPD descriptions. In this case, the corresponding USD and MPD may be further delivered to the MBMS client, and the unicast request of the DASH client may be turned down when the broadcast starts.

It can be learnt that, in the technical solution in this embodiment, the media presentation description file of the multi-stream multimedia streaming service i and the media presentation description file of the multimedia streaming service j are two different media presentation description files. This means that different multimedia streaming services each have a corresponding media presentation description file. The association relationship between the presentation object a and the multimedia streaming service j is introduced, which means that some level of association relationship between a multi-stream multimedia streaming service and another multimedia streaming service is introduced. Therefore, when the presentation object a of the X presentation objects is selected, the DASH client can obtain the media presentation description file of the multimedia streaming service j that has an association relationship with the presentation object a, and the DASH client can further obtain, from the server according to the media presentation description file of the multimedia streaming service j, m1 multimedia streams of the M multimedia streams included in the multimedia streaming service j and present the m1 multimedia streams. It is obvious that the foregoing technical solution helps better implement flexible switching between a multi-stream multimedia streaming service and another multimedia streaming service, and therefore helps improve user experience of an interactive multimedia streaming service.

Referring to FIG. 3-a and FIG. 3-b, FIG. 3-a is a schematic flowchart of a multimedia streaming service presentation method based on HTTP streaming according to another embodiment of the present application. The multimedia streaming service presentation method based on HTTP streaming shown in FIG. 3-a may be specifically implemented based on a network architecture shown in FIG. 3-b. The network architecture shown in FIG. 3-b mainly includes a DASH client, a PSS server & HTTP server, and the like.

As shown in FIG. 3-a, the multimedia streaming service presentation method based on HTTP streaming according to the another embodiment of the present application may include the following steps.

301. The DASH client receives a media presentation description file of a multi-stream multimedia streaming service i from the PSS server & HTTP server.

The multi-stream multimedia streaming service i may be, for example, a mosaic service or a multi-stream multimedia streaming service of another type.

The media presentation description file of the multi-stream multimedia streaming service i describes N multimedia streams included in the multi-stream multimedia streaming service i. N is an integer greater than 1. N may be equal to, for example, 2, 3, 4, 5, 8, 11, 15, 20, 25, 30, or another value.

302. The DASH client obtains, from the PSS server & HTTP server, n1 multimedia streams of N multimedia streams included in the multi-stream multimedia streaming service i.

The DASH client may obtain, from the PSS server & HTTP server, the n1 multimedia streams of the N multimedia streams included in the multi-stream multimedia streaming service i in a form of DASH segments. The DASH segments of the n1 multimedia streams may be transmitted to the DASH client by using the HTTP protocol.

303. The DASH client presents X presentation objects formed by the n1 multimedia streams.

The n1 multimedia streams may include a video stream, a subtitle stream, an audio stream, and the like.

The DASH client may present the X presentation objects respectively in X logical presentation cells. The X logical presentation cells and the X presentation objects may be in a one-to-one correspondence. A presentation object of the X presentation objects may be formed by one or more multimedia streams of the n1 multimedia streams, for example, may be formed by one video stream or one audio stream, may be formed by one video stream and one subtitle stream, or may be formed by one video stream, one subtitle stream, and one audio stream.

Optionally, in some possible implementations of the present application, a description element, corresponding to a presentation object a, in the media presentation description file of the multi-stream multimedia streaming service i describes an association relationship between at least two multimedia streams associated with the presentation object a. The at least two multimedia streams associated with the presentation object a are multimedia streams of the N multimedia streams, that is, the at least two multimedia streams belong to the multi-stream multimedia streaming service i. For some specific implementations of describing, by the media presentation description file of the multi-stream multimedia streaming service i, the association relationship between the at least two multimedia streams associated with the presentation object a, reference may be made to related descriptions in the foregoing embodiment. Details are not described herein again.

It can be learnt that multiple manners are provided as examples in this embodiment of the present application to associate at least two multimedia streams associated with the presentation object a, and the at least two multimedia streams belong to the multi-stream multimedia streaming service i. That is, the foregoing example solutions provide multiple implementations how multimedia streams in one multi-stream multimedia streaming service are associated. Therefore, multimedia streams in one multi-stream multimedia streaming service can be associated flexibly. There may be many advantages to flexibly associate multimedia streams in one multi-stream multimedia streaming service.

For a logical presentation cell with which a focus stays (the logical presentation cell with which the focus stays may be, for example, in a highlighted state), the DASH client may further present an audio stream corresponding to a video stream presented by the logical presentation cell.

During a process of viewing the X presentation objects by a user, the user may control the focus to move between logical presentation cells, that is, a highlighted logical presentation cell may change. The DASH client may obtain, according to a description of the media presentation description file of the multi-stream multimedia streaming service i, an audio stream associated with a video stream presented by the highlighted logical presentation cell, and present the audio stream associated with the video stream presented by the highlighted logical presentation cell. Alternatively, the DASH client may obtain, according to a description of the media presentation description file of the multi-stream multimedia streaming service i, all audio and video streams included in the multi-stream multimedia streaming service i, but, as to an audio stream presentation manner, the DASH client may present only an audio stream associated with a video stream presented by a highlighted logical presentation cell.

304. When a presentation object a of the X presentation objects is selected (for example, a user double-clicks a logical presentation cell corresponding to the presentation object a), the DASH client obtains, from the PSS server & HTTP server according to a description of the media presentation description file of the multi-stream multimedia streaming service i, a media presentation description file of a multimedia streaming service j that has an association relationship with the presentation object a.

The association relationship between the presentation object a and the multimedia streaming service j may be described by the media presentation description file of the multi-stream multimedia streaming service i in many possible manners. A manner of describing the association relationship between the presentation object a and the multimedia streaming service j may be determined according to a specific scenario requirement. For some specific implementations of describing, by the media presentation description file of the multi-stream multimedia streaming service i, the association relationship between the presentation object a and the multimedia streaming service j, reference may be made to related descriptions in the foregoing embodiment. Details are not described herein again.

305. The DASH client obtains m1 multimedia streams of the M multimedia streams from the PSS server & HTTP server according to the MPD of the multimedia streaming service j.

306. The DASH client presents the m1 multimedia streams.

The association relationship between the presentation object a and the multimedia streaming service j may be described by the media presentation description file of the multi-stream multimedia streaming service i in many possible manners. A manner of describing the association relationship between the presentation object a and the multimedia streaming service j may be determined according to a specific scenario requirement. For some specific implementations of describing, by the media presentation description file of the multi-stream multimedia streaming service i, the association relationship between the presentation object a and the multimedia streaming service j, reference may be made to related descriptions in the foregoing embodiment. Details are not described herein again.

Optionally, in some possible implementations of the present application, when the description element, corresponding to the presentation object a, in the media presentation description file of the multi-stream multimedia streaming service i further indicates that the DASH client performs presentation in a manner of keeping temporal continuity, temporal continuity may be kept between presentation of the m1 multimedia streams by the DASH client and presentation of the presentation object a by the DASH client. Certainly, keeping temporal continuity herein does not necessarily mean keeping temporal continuity in a strict sense, and may be keeping temporal continuity within a given tolerance.

For example, an XLink element may indicate that the DASH client performs presentation in a manner of keeping temporal continuity. When the XLink element indicates that the DASH client performs presentation in a manner of keeping temporal continuity, temporal continuity is kept between presentation of the m1 multimedia streams by the DASH client and presentation of the presentation object a by the DASH client.

Specifically, for example, when the XLink element indicates that the DASH client performs presentation in a manner of keeping temporal continuity, the presenting the m1 multimedia streams by the DASH client includes: presenting, by the DASH client, the m1 multimedia streams from a start time point that is a time point when the presentation object a is selected.

Specifically, for example, when the XLink element indicates that the DASH client performs presentation in a manner of keeping temporal continuity, the presenting the m1 multimedia streams by the DASH client includes: presenting, by the DASH client, the m1 multimedia streams from a start time point that is a time point when presentation of the presentation object a is stopped.

For example, a show attribute of the XLink element may indicate that the DASH client performs presentation in a manner of keeping temporal continuity.

For example, xlink:show="continue" may indicate that presentation is performed in a manner of keeping temporal continuity. This is equivalent to a value extension of xlink:show, that is, a new value is added for xlink:show.

For another example, xlink:show="other", and description information, such as continuation, of an associated service to which XLink points is added, where continuation is an XLink attribute or not an XLink attribute. For example, xlink:continuation="true" or xlinkContinuation="true" may indicate that presentation is performed in manner of keeping temporal continuity, that is, indicate that temporal continuity is kept when the client switches from an original multimedia streaming service to an associated multimedia streaming service.

For example, if playback of an original multimedia streaming service currently stops at a time point A, after switching to an associated multimedia streaming service, the client may continue to decode and present a corresponding media stream from the time point A.

In addition, for switching from the multi-stream multimedia streaming service i to the associated multimedia streaming service, the MPD may alternatively indicate that temporal continuity does not need to be kept between the multi-stream multimedia streaming service i and the associated multimedia streaming service j, that is, the associated multimedia streaming service j may be presented from the start as a new service.

In this case, for example, xlink:show="replace"/"new"/ "other". This extends usage of XLink in the DASH standard and incorporates attribute values defined in W3C. Herein, replace indicates that an associated multimedia streaming service replaces an original multimedia streaming service in an original service window for presentation, and new indicates that an associated multimedia streaming service is presented in a new window. When a value is replace or new, switching to an associated multimedia streaming service is performed, and presentation of a current multimedia streaming service is stopped. If presentation of the current multimedia streaming service continues, but it is specified that, at the time of switching from the multi-stream multimedia streaming service i to the associated multimedia streaming service, temporal continuity does not need to be kept between the multi-stream multimedia streaming service and the associated multimedia streaming service, it may be only necessary to present the associated multimedia streaming service from the start as a new service. Description information continuation of an associated multimedia streaming service to which XLink points may be added. For example, xlink:continuation="false" or xlinkContinuation="false" indicates that temporal continuity does not need to be kept when the DASH client switches from an original multimedia streaming service to an associated multimedia streaming service.

It can be learnt that, in the technical solution in this embodiment, the media presentation description file of the multi-stream multimedia streaming service i and the media presentation description file of the multimedia streaming service j are two separate media presentation description files. This means that different multimedia streaming services each have a separate media presentation description file. The association relationship between the presentation object a and the multimedia streaming service j is introduced. Therefore, when the presentation object a of the X presentation objects is selected, the DASH client can obtain the media presentation description file of the multimedia streaming service j that has an association relationship with the presentation object a, and the DASH client can further obtain, from the content server according to the media presentation description file of the multimedia streaming service j, m1 multimedia streams of the M multimedia streams included in the multimedia streaming service j. It is obvious that this helps better implement flexible switching between a multi-stream multimedia streaming service and another multimedia streaming service.

The following provides descriptions using examples with reference to several more specific application scenarios.

The following first describes some technical requirements. These mainly include playback of audio corresponding to a highlighted logical presentation cell by the client in a mosaic service mode. For example, when a user clicks a logical presentation cell, the client switches to a normal playback mode, and plays a program (that is, a multimedia stream) corresponding to the clicked logical presentation cell. With 4G deployment, mobile broadband applications have been developing rapidly, and an interactive multiview video technology and the like attract more attention, for example, a multiview live sports event technology and the like are receiving increasing concern.

Scenario S1: In the scenario S1, that a multi-stream multimedia streaming service i is a mosaic service is mainly used as an example.

The multi-stream multimedia streaming service i has a corresponding MPD, and other multimedia streaming services that have an association relationship with the multi-stream multimedia streaming service i also have corresponding MPDs respectively. That is, for N multimedia streaming services associated with the multi-stream multimedia streaming service i (the N multimedia streaming services may also be referred to as N associated programs), it is assumed that there are N thumbnails (that is, N presentation objects, and the presentation objects may be described by SubRepresentation elements) in the mosaic service, and there are N+1 MPDs in total, that is, one MPD of the mosaic service and N MPDs of the associated programs. In this scenario, for the mosaic service, only main media streams, that is, audio and video streams are considered, and other secondary media streams are not considered. It is assumed that the mosaic service is a server-generated solution, and small images of multiple video bitstreams are synthesized into one bitstream at a coding layer.

The server may perform secondary encoding and decoding processing on original media streams of programs.

A video steam of the mosaic service is a bitstream obtained by means of code synthesis. The client may need a video codec for processing. However, code synthesis is not applied on audio. An audio stream and its association relationship, that is, an association between each region presented on a screen and the audio stream, need to be described separately.

In view that code synthesis processing is performed on video streams of thumbnails in the mosaic service on the server, if the thumbnails are described by using SubRepresentation elements, there is no @contentComponent in the SubRepresentation elements, that is, SubRepresentation elements with no media content.

A presentation location of the mosaic service may be described, for example, by using an attribute set (source id, x, y, w, h, W, H, spatial_set_id) in an MPEG DASH SRD, where the attribute set is an attribute set in a SubRepresentation element.

An association relationship between each thumbnail in the mosaic service and a multimedia streaming service associated with each thumbnail may be described, for example, as follows: An XLink element is introduced into a SubRepresentation element, where xlink:href="MPD link of the associated service", xlink:show="other", and xlink:actuate="onRequest"; and xlinkContinuation="true" is also introduced. It indicates that switching from a current multimedia streaming service to an associated multimedia streaming service occurs only in the event of a specified action. For example, when a specified thumbnail is double-clicked, switching to a multimedia streaming service associated with the thumbnail is performed, and a media stream of the associated multimedia streaming service starts to be presented from a current time point.

An association relationship between each video stream of each thumbnail in the mosaic service and an audio stream associated with each video stream may be described, for example, as follows:

An @associationID attribute and an @associationType attribute may be introduced into a SubRepresentation element, to indicate an audio stream associated with each thumbnail. The @associationType attribute may carry characters "cmps", and the @associationID attribute may carry an identifier of a representation corresponding to the associated audio stream.

A select-one-from-multiple relationship existing when multiple thumbnails in the mosaic service are presented may be described, for example, as follows: Audio streams corresponding to thumbnails are described respectively in different AdaptationSet elements, and these AdaptationSet elements have @group attributes that have a same non-zero value.

It is assumed that in the current mosaic service, navigation elements of four multimedia streaming services are presented in a 2*2 manner. For example, URLs corresponding to MPDs of the multimedia streaming services associated with thumbnails may respectively be as follows:

http://www.example.com/movie/MPD-1.mpd
http://www.example.com/movie/MPD-2.mpd
http://www.example.com/movie/MPD-3.mpd
http://www.example.com/movie/MPD-4.mpd The following provides a possible example of an MPD that can be applied in the scenario S1:

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <ProgramInformation>
        <Title>Example of a DASH Media Presentation Description using
Spatial Relationships Description to indicate a mosaic video</Title>
    </ProgramInformation>
    <Period>
        <AdaptationSet segmentAlignment="true" subsegmentAlignment="true" subsegmentStartsWithSAP="1">
            <Representation id="Full_v_mosaic" mimeType="video/mp4" codecs="avc1.42c01e" width="640" height="360" bandwidth="226597" startWithSAP="1">
                <BaseURL> full_video_small.mp4</BaseURL>
                <!--thumbnail 1 -->
                <SubRepresentation xlinkContinuation="true"
xlink:href="http://www.example.com/movie/MPD-1.mpd"
xlink:show="other" xlink:actuate="onRequest"
associationId="C1_a_sd" associationType="cmps">
                    <SupplementalProperty
schemeIdUri="urn:mpeg:dash:srd:2014" value="0,0,0,1,1,2,2"/>
                </SubRepresentation>
                <!--thumbnail 2 -->
                <SubRepresentation xlinkContinuation="true"
xlink:href="http://www.example.com/movie/MPD-2.mpd"
xlink:show="other" xlink:actuate="onRequest"
associationId="C2_a_sd" associationType="cmps">
                    <SupplementalProperty
schemeIdUri="urn:mpeg:dash:srd:2014" value="0,1,0,1,1,2,2"/>
                </SubRepresentation>
                <!--thumbnail 3 -->
                <SubRepresentation xlinkContinuation="true"
xlink:href="http://www.example.com/movie/MPD-3.mpd"
xlink:show="other" xlink:actuate="onRequest"
associationId="C3_a_sd" associationType="cmps">
                    <SupplementalProperty
schemeIdUri="urn:mpeg:dash:srd:2014" value="0,0,1,1,1,2,2"/>
                </SubRepresentation>
                <!--thumbnail 4 -->
                <SubRepresentation xlinkContinuation="true"
xlink:href="http://www.example.com/movie/MPD-4.mpd"
xlink:show="other" xlink:actuate="onRequest"
associationId="C4_a_sd" associationType="cmps">
                    <SupplementalProperty
schemeIdUri="urn:mpeg:dash:srd:2014" value="0,1,1,1,1,2,2"/>
                </SubRepresentation>
            </Representation>
        </AdaptationSet>
        <!-- To put them into individual adaptation sets. -->
        <!--audio1 -->
        <AdaptationSet mimeType="audio/mp4" codecs="mp4a.40" lang="en" subsegmentAlignment="true" subsegmentStartsWithSAP="1">
            <Representation id="C1_a_sd " bandwidth="64000" group="1">
                <BaseURL>Channel1_audio_hd.mp4</BaseURL>
            </Representation>
        </AdaptationSet>
        <!--audio2 -->
        <AdaptationSet mimeType="audio/mp4" codecs="mp4a.40" lang="en" subsegmentAlignment="true" subsegmentStartsWithSAP="1">
            <Representation id="C2_a_sd " bandwidth="32000" group="1">
                <BaseURL>Channel2_audio_hd.mp4</BaseURL>
            </Representation>
        </AdaptationSet>
        <!--audio3 -->
        <AdaptationSet mimeType="audio/mp4" codecs="mp4a.40" lang="en" subsegmentAlignment="true" subsegmentStartsWithSAP="1">
            <Representation id="C3_a_sd " bandwidth="32000" group="1">
                <BaseURL>Channel3_audio_hd.mp4</BaseURL>
            </Representation>
        </AdaptationSet>
        <!--audio4 -->
        <AdaptationSet mimeType="audio/mp4" codecs="mp4a.40" lang="en" subsegmentAlignment="true" subsegmentStartsWithSAP="1">
            <Representation id="C4_a_sd " bandwidth="32000" group="1">
                <BaseURL>Channel4_audio_hd.mp4</BaseURL>
            </Representation>
        </AdaptationSet>
    </Period>
</MPD>
```

Scenario S2: In the scenario S2, that a multi-stream multimedia streaming service i is a mosaic service is mainly used as an example.

The multi-stream multimedia streaming service i has an MPD, and other multimedia streaming services that have an association relationship with the multi-stream multimedia streaming service i also have their respective MPDs. That is, for N multimedia streaming services associated with the multi-stream multimedia streaming service i (the N multimedia streaming services may also be referred to as N associated programs), it is assumed that there are N thumbnails (that is, N presentation objects, and the presentation objects may be described by SubRepresentation elements) in the mosaic service, and there are N+1 MPDs in total, that is, one MPD of the mosaic service and NMPDs of the associated programs. In this scenario, for the mosaic service, only main media streams, that is, audio and video streams are considered, and other secondary media streams are not considered. It is assumed that the mosaic service is a server-generated solution, and small images of multiple video bitstreams are synthesized into one bitstream at a transport layer.

The server does not need to perform secondary encoding and decoding processing on original media streams of programs, but only needs to interleave these original media streams into one bitstream.

For the client, a video stream of the mosaic service is one bitstream, but no code synthesis processing is performed. Therefore, the client may finally obtain multiple video streams by means of decoding, and present the multiple video streams according to specified presentation object locations of the mosaic service.

Because video streams of thumbnails in the mosaic service are interleaved into one bitstream on the server side, SubRepresentation elements may be used to describe the thumbnails, and the SubRepresentation elements are corresponding to the thumbnails. Audio streams corresponding to the thumbnails in the mosaic service are respectively described by different AdaptationSet elements.

A presentation location of the mosaic service may be described, for example, by using an attribute set (source id, x, y, w, h, W, H, spatial_set_id) in an MPEG DASH SRD, where the attribute set is an attribute set in a SubRepresentation element.

An association relationship between each thumbnail in the mosaic service and a multimedia streaming service associated with each thumbnail may be described, for example, as follows: An XLink element is introduced into a SubRepresentation element, where xlink:href="MPD link of the associated service", xlink:show="continue", and xlink:actuate="onRequest". It indicates that switching from a current multimedia streaming service to an associated multimedia streaming service occurs only in the event of a specified action. For example, when a specified thumbnail is double-clicked, switching to a multimedia streaming service associated with the thumbnail is performed, and a media stream of the associated multimedia streaming service starts to be presented from a current time point.

A select-one-from-multiple relationship existing when multiple thumbnails in the mosaic service are presented may be described, for example, as follows: Audio streams corresponding to thumbnails are described respectively in different AdaptationSet elements, and these AdaptationSet elements have @group attributes that have a same non-zero value.

An association relationship between each video stream of each thumbnail in the mosaic service and an audio stream associated with each video stream may be described, for example, as follows:

An @id attribute is introduced into a SubRepresentation element, and an @associationID attribute and an @associationType attribute are introduced into an AdaptationSet element or a Representation element, to indicate an association between each audio stream and each thumbnail. The @associationType attribute may carry characters "cmps", and the @associationID attribute may carry an identifier of a sub-representation corresponding to the associated video stream.

It is assumed that in the current mosaic service, navigation elements of four multimedia streaming services are presented in a 2*2 manner. For example, URLs corresponding to MPDs of the multimedia streaming services associated with thumbnails may respectively be as follows:
http://www.example.com/movie/MPD-1.mpd
http://www.example.com/movie/MPD-2.mpd
http://www.example.com/movie/MPD-3.mpd
http://www.example.com/movie/MPD-4.mpd The following provides a possible example of an MPD that can be applied in the scenario S2:

```
<?xml version="1.0" encoding="UTF-8"?>
<MPD
    xmlns="urn:mpeg:dash:schema:mpd:2011"
    type=static
    mediaPresentationDuration="PT10S"
    minBufferTime="PT1S"
    profiles="urn:mpeg:dash:profile:isoff-on-demand:2011">
  <ProgramInformation>
    <Title>Example of a DASH Media Presentation Description using
Spatial Relationships Description to indicate a mosaic
video</Title>
  </ProgramInformation>
  <Period>
    <AdaptationSet segmentAlignment="true"
subsegmentAlignment="true" subsegmentStartsWithSAP="1">
      <Representation id="Full_v_mosaic" mimeType="video/mp4"
codecs="avc1.42c01e"width="640"height="360"bandwidth="226597"
startWithSAP="1">
        <BaseURL> full_video_small.mp4</BaseURL>
        <!--thumbnail 1 -->
        <SubRepresentation id="C1_v"
xlink:href="http://www.example.com/movie/MPD-1.mpd"
xlink:show="continue" xlink:actuate="onRequest">
          <SupplementalProperty
schemeIdUri="urn:mpeg:dash:srd:2014" value="0,0,0,1,1,2,2"/>
        </SubRepresentation>
        <!--thumbnail 2 -->
        <SubRepresentation id="C2_v"
xlink:href="http://www.example.com/movie/MPD-2.mpd"
xlink:show="continue" xlink:actuate="onRequest">
          <SupplementalProperty
schemeIdUri="urn:mpeg:dash:srd:2014" value="0,1,0,1,1,2,2"/>
        </SubRepresentation>
        <!--thumbnail 3 -->
        <SubRepresentation id="C3_v"
xlink:href="http://www.example.com/movie/MPD-3.mpd"
xlink:show="continue" xlink:actuate="onRequest">
          <SupplementalProperty
schemeIdUri="urn:mpeg:dash:srd:2014" value="0,0,1,1,1,2,2"/>
        </SubRepresentation>
        <!--thumbnail 4 -->
        <SubRepresentation id="C4_v"
xlink:href="http://www.example.com/movie/MPD-4.mpd"
xlink:show="continue" xlink:actuate="onRequest">
          <SupplementalProperty
schemeIdUri="urn:mpeg:dash:srd:2014" value="0,1,1,1,1,2,2"/>
        </SubRepresentation>
      </Representation>
    </AdaptationSet>
    <!-- To put them into individual adaptation sets. -->
    <!--audio1 -->
    <AdaptationSet mimeType="audio/mp4" codecs="mp4a.40"
lang="en" subsegmentAlignment="true"
subsegmentStartsWithSAP="1">
      <Representation id="C1_a_sd" bandwidth="64000"
associationId="C1_V" associationType="cmps" group="1">
        <BaseURL>Channel1_audio_hd.mp4</BaseURL>
      </Representation>
    </AdaptationSet>
    <!--audio2 -->
    <AdaptationSet mimeType="audio/mp4" codecs="mp4a.40"
```

-continued

```
lang="en" subsegmentAlignment="true"
subsegmentStartsWithSAP="1">
        <Representation id="C2_a_sd" bandwidth="32000"
associationId="C2_V" associationType="cmps" group="1">
            <BaseURL>Channel2_audio_hd.mp4</BaseURL>
        </Representation>
    </AdaptationSet>
    <!--audio3 -->
    <AdaptationSet mimeType="audio/mp4" codecs="mp4a.40"
lang="en" subsegmentAlignment="true"
subsegmentStartsWithSAP="1">
        <Representation id="C3_a_sd" bandwidth="32000"
associationId="C3_V" associationType="cmps" group="1">
            <BaseURL>Channel3_audio_hd.mp4</BaseURL>
        </Representation>
    </AdaptationSet>
    <!--audio4 -->
    <AdaptationSet mimeType="audio/mp4" codecs="mp4a.40"
lang="en" subsegmentAlignment="true"
subsegmentStartsWithSAP="1">
        <Representation id="C4_a_sd" bandwidth="32000"
associationId="C4_V" associationType="cmps" group="1">
            <BaseURL>Channel4_audio_hd.mp4</BaseURL>
        </Representation>
    </AdaptationSet>
  </Period>
</MPD>
```

Scenario S3: In the scenario S3, that a multi-stream multimedia streaming service i is a mosaic service is mainly used as an example.

The multi-stream multimedia streaming service i has an MPD, and other multimedia streaming services that have an association relationship with the multi-stream multimedia streaming service i also have their respective MPDs. That is, for N multimedia streaming services associated with the multi-stream multimedia streaming service i (the N multimedia streaming services may also be referred to as N associated programs), it is assumed that there are N thumbnails (that is, N presentation objects, and the presentation objects may be described by AdaptationSet elements) in the mosaic service, and there are N+1 MPDs in total, that is, one MPD of the mosaic service and N MPDs of the associated programs. In this scenario, for the mosaic service, only main media streams, that is, audio and video streams are considered, and other secondary media streams are not considered. It is assumed that the mosaic service is a UE-generated mosaic solution, and small images of multiple video bit-streams are independent bitstreams.

The server does not need to perform secondary encoding and decoding processing on original media streams of programs.

For the client, video streams of the mosaic service are multiple bitstreams, but no code synthesis processing is performed. Therefore, the client may obtain multiple video streams by means of decoding by using multiple video codecs, and present the multiple video streams according to specified presentation object locations of the mosaic service.

In view that, for video streams of thumbnails in the mosaic service, the thumbnails may be described by different AdaptationSet elements, audio streams corresponding to the thumbnails in the mosaic service may be respectively described in different adaptation sets.

A presentation location of the mosaic service may be described, for example, by using an attribute set (source id, x, y, w, h, W, H, spatial_set_id) in an MPEG DASH SRD, where the attribute set is an attribute set in an AdaptationSet element.

An association relationship between each thumbnail in the mosaic service and a multimedia streaming service associated with each thumbnail may be described, for example, as follows:

An XLink element is introduced into an AdaptationSet element or a Representation element, where
xlink:href="MPD link of the associated service",
xlink:actuate="onRequest", and xlink:show="continue".
It indicates that switching from a current multimedia streaming service to an associated multimedia streaming service occurs only in the event of a specified action. For example, when a specified thumbnail is double-clicked, switching to a multimedia streaming service associated with the thumbnail is performed, and a media stream of the associated multimedia streaming service starts to be presented from a current time point.

An association relationship between each video stream of each thumbnail in the mosaic service and an audio stream associated with each video stream may be described, for example, as follows: An @associationID attribute and an @associationType attribute may be introduced into an AdaptationSet element, to indicate an association between each audio stream and each thumbnail. The @associationType attribute may carry characters "cmps", and the @associationID attribute may carry an identifier of a representation corresponding to the associated audio stream.

A select-one-from-multiple relationship existing when multiple thumbnails in the mosaic service are presented may be described, for example, as follows: Audio streams corresponding to thumbnails are described respectively in different AdaptationSet elements, and these AdaptationSet elements have @group attributes that have a same non-zero value.

It is assumed that in the current mosaic service, navigation elements of four multimedia streaming services are presented in a 2*2 manner. For example, URLs corresponding to MPDS of the multimedia streaming services associated with thumbnails may respectively be as follows:
http://www.example.com/movie/MPD-1.mpd
http://www.example.com/movie/MPD-2.mpd
http://www.example.com/movie/MPD-3.mpd
http://www.example.com/movie/MPD-4.mpd The following provides a possible example of an MPD that can be applied in the scenario S3:

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <ProgramInformation>
        <Title>Example of a DASH Media Presentation Description using
Spatial Relationships Description to indicate a mosaic video</Title>
    </ProgramInformation>
    <Period>
        <!--thumbnail 1 -->
        <AdaptationSet segmentAlignment="true"
subsegmentAlignment="true" subsegmentStartsWithSAP="1"
xlink:href="http://www.example.com/movie/MPD-1.mpd"
xlink:show="continue" xlink:actuate="onRequest"
associationId="C1_a_sd" associationType="cmps">
            <Representation id="C1_v_mosaic" mimeType="video/mp4"
codecs="avc1.42c01e" width="640" height="360" bandwidth="226597"
startWithSAP="1">
                <BaseURL> C1_video_small.mp4</BaseURL>
                <SupplementalProperty
schemeIdUri="urn:mpeg:dash:srd:2014" value="0,0,0,1,1,2,2"/>
```

```xml
        </Representation>
      </AdaptationSet>
      <!--thumbnail 2 -->
      <AdaptationSet segmentAlignment="true"
subsegmentAlignment="true" subsegmentStartsWithSAP="1"
xlink:href="http://www.example.com/movie/MPD-2.mpd"
xlink:show="continue" xlink:actuate="onRequest"
associationId="C2_a_sd" associationType="cmps">
        <Representation id="C2_v_mosaic" mimeType="video/mp4"
codecs="avc1.42c01e" width="640" height="360" bandwidth="226597"
startWithSAP="1">
          <BaseURL> C2_video_small.mp4</BaseURL>
          <SupplementalProperty
schemeIdUri="urn:mpeg:dash:srd:2014" value="0,1,0,1,1,2,2"/>
        </Representation>
      </AdaptationSet>
      <!--thumbnail 3 -->
      <AdaptationSet segmentAlignment="true"
subsegmentAlignment="true" subsegmentStartsWithSAP="1"
xlink:href="http://www.example.com/movie/MPD-3.mpd"
xlink:show="continue" xlink:actuate="onRequest"
associationId="C3_a_sd" associationType="cmps">
        <Representation id="C3_v_mosaic" mimeType="video/mp4"
codecs="avc1.42c01e" width="640" height="360" bandwidth="226597"
startWithSAP="1">
          <BaseURL>C3_video small.mp4</BaseURL>
          <SupplementalProperty
schemeIdUri="urn:mpeg:dash:srd:2014" value="0,0,1,1,1,2,2"/>
        </Representation>
      </AdaptationSet>
      <!--thumbnail 4 -->
      <AdaptationSet segmentAlignment="true"
subsegmentAlignment="true" subsegmentStartsWithSAP="1"
xlink:href="http://www.example.com/movie/MPD-4.mpd"
xlink:show="continue" xlink:actuate="onRequest"
associationId="C4_a_sd" associationType="cmps">
        <Representation id="C4_v_mosaic" mimeType="video/mp4"
codecs="avc1.42c01e" width="640" height="360" bandwidth="226597"
startWithSAP="1">
          <BaseURL> C4_video small.mp4</BaseURL>
          <SupplementalProperty
schemeIdUri="urn:mpeg:dash:srd:2014" value="0,1,1,1,1,2,2"/>
        </Representation>
      </AdaptationSet>
      <!--audio1 -->
      <AdaptationSet mimeType="audio/mp4" codecs="mp4a.40"
lang="en"
subsegmentAlignment="true" subsegmentStartsWithSAP="1">
        <Representation id="C1_a_sd " bandwidth="64000"
group="1">
          <BaseURL>Channel1_audio_hd.mp4</BaseURL>
        </Representation>
      </AdaptationSet>
      <!--audio2 -->
      <AdaptationSet mimeType="audio/mp4" codecs="mp4a.40"
lang="en"
subsegmentAlignment="true" subsegmentStartsWithSAP="1">
        <Representation id="C2_a_sd " bandwidth="32000"
group="1">
          <BaseURL>Channel2_audio_hd.mp4</BaseURL>
        </Representation>
      </AdaptationSet>
      <!--audio3 -->
      <AdaptationSet mimeType="audio/mp4" codecs="mp4a.40"
lang="en"
subsegmentAlignment="true" subsegmentStartsWithSAP="1">
        <Representation id="C3_a_sd " bandwidth="32000"
group="1">
          <BaseURL>Channel3_audio_hd.mp4</BaseURL>
        </Representation>
      </AdaptationSet>
      <!--audio4 -->
      <AdaptationSet mimeType="audio/mp4" codecs="mp4a.40"
lang="en"
subsegmentAlignment="true" subsegmentStartsWithSAP="1">
        <Representation id="C4_a_sd " bandwidth="32000"
group="1">
          <BaseURL>Channel4_audio_hd.mp4</BaseURL>
        </Representation>
      </AdaptationSet>
    </Period>
</MPD>
```

Scenario S4: In the scenario S4, a multiview live sports event service scenario is mainly used as an example.

It is assumed that sports event programs (media streams) of various views have independent video streams, but share one audio stream. When a user selects a view to watch a sports event program of the view in full screen, temporal continuity is kept for the event so as to ensure user experience.

The content server may not need to perform secondary processing on original media streams of the sports event programs of the various views.

The client treats the sports event program of each view as an independent bitstream, and may perform decoding and presentation by using multiple codecs.

Presentation objects corresponding to the sports event programs of the various views (a sports event program of each view is corresponding to a different presentation object, and the presentation object may be described by an AdaptationSet element) may be described by different AdaptationSet elements. The sports event programs of all the views share one audio stream.

A presentation location of the sports event program of each view may be described, for example, by using an attribute set (source id, x, y, w, h, W, H, spatial_set_id) in an MPEG DASH SRD, where the attribute set is an attribute set in an AdaptationSet element.

An association relationship between the sports event program of each view and a multimedia streaming service associated with the program may be described, for example, as follows:

An XLink element is introduced into the AdaptationSet element that describes the sports event program of each view, where xlink:href="MPD link of the associated service", xlink:actuate="onRequest", and xlink:show="continue". It indicates that switching from a current multimedia streaming service to an associated multimedia streaming service occurs only in the event of a specified action. For example, when a sports event program of a specified view is double-clicked, switching to a full screen of the sports event program of this view is performed, and the sports event program of this view starts to be presented from a current time point.

An association relationship between the sports event program of each view and audio associated with the program may be described as follows: an @associationID attribute and an @associationType attribute are introduced into an AdaptationSet element, to specify the audio stream associated with the sport event program of the view. The association relationship may be described by a description element corresponding to the audio. For example, the @associationType attribute may carry characters "cmps", and the @associationID attribute may carry an identifier of a representation corresponding to the associated video stream of the sports event program of each view.

The sports event programs of multiple views in a multi-view live sports event program share one audio stream. Therefore, there is no select-one-from-multiple relationship among audio streams.

It is assumed that in the current multiview live sports event service, sports event content of four views is presented in a 2*2 manner. For example, URLs corresponding to MPDs of the full-screen programs associated with the sports event programs of the various views may respectively be as follows:

http://www.example.com/movie/MPD-1.mpd
http://www.example.com/movie/MPD-2.mpd
http://www.example.com/movie/MPD-3.mpd
http://www.example.com/movie/MPD-4.mpd The following provides a possible example of an MPD that can be applied in the scenario S4:

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-live:2011">
    <ProgramInformation>
        <Title>Example of a DASH Media Presentation Description using
Spatial Relationships Description to indicate a multiple-view sport game</Title>
    </ProgramInformation>
    <Period>
        <!-thumbnail 1 -->
        <AdaptationSet id="C1_v" segmentAlignment="true" subsegmentAlignment="true" subsegmentStartsWithSAP="1"
xlink:href="http://www.example.com/movie/MPD-1.mpd"
xlink:show="other" xlink:actuate="onRequest"
xlink:continuation="true">
            <Representation mimeType="video/mp4" codecs="avc1.42c01e"
width=640 height="360" bandwidth="226597" startWithSAP="1">
                <BaseURL> C1_video_small.mp4</BaseURL>
                <SupplementalProperty
schemeIdUri="urn:mpeg:dash:srd:2014" value="0,0,0,1,1,2,2"/>
            </Representation>
        </AdaptationSet>
        <!-thumbnail 2 -->
        <AdaptationSet id="C2_v" segmentAlignment="true" subsegmentAlignment="true" subsegmentStartsWithSAP="1"
xlink:href="http://www.example.com/movie/MPD-2.mpd"
xlink:show="other" xlink:actuate="onRequest"
xlink:continuation="true">
            <Representation mimeType="video/mp4" codecs="avc1.42c0le"
width=640 height="360" bandwidth="226597" startWithSAP="1">
                <BaseURL> C2_video_small.mp4</BaseURL>
                <SupplementalProperty
schemeIdUri="urn:mpeg:dash:srd:2014" value="0,1,0,1,1,2,2"/>
            </Representation>
        </AdaptationSet>
        <!-thumbnail 3 -->
        <AdaptationSet id="C3_v" segmentAlignment="true" subsegmentAlignment="true" subsegmentStartsWithSAP="1"
xlink:href="http://www.example.com/movie/MPD-3.mpd"
xlink:show="other" xlink:actuate="onRequest"
xlink:continuation="true">
            <Representation mimeType="video/mp4" codecs="avc1.42c01e"
width=640 height="360" bandwidth="226597" startWithSAP="1">
                <BaseURL>C3_video_small.mp4</BaseURL>
                <SupplementalProperty
schemeIdUri="urn:mpeg:dash:srd:2014" value="0,0,1,1,1,2,2"/>
            </Representation>
        </AdaptationSet>
        <!-thumbnail 4 -->
        <AdaptationSet id="C4_v" segmentAlignment="true" subsegmentAlignment="true" subsegmentStartsWithSAP="1"
xlink:href="http://www.example.com/movie/MPD-4.mpd"
xlink:show="other" xlink:actuate="onRequest"
xlink:continuation="true">
            <Representation mimeType="video/mp4" codecs="avc1.42c01e"
width=640 height="360" bandwidth="226597" startWithSAP="1">
                <BaseURL> C4_video_small.mp4</BaseURL>
                <SupplementalProperty
```

-continued

```
schemeIdUri="urn:mpeg:dash:srd:2014" value="0,1,1,1,2,2"/>
            </Representation>
        </AdaptationSet>
        <!-audio -->
        <AdaptationSet mimeType="audio/mp4" codecs="mp4a.40" lang="en"
subsegmentAlignment="true" subsegmentStartsWithSAP="1"
associationId="C1_v C2_v C3_v C4_v" associationType="cmps cmpscmps cmps">
            <Representation id="C1_a_sd " bandwidth="64000">
                <BaseURL> Channel1_audio_hd.mp4</BaseURL>
            </Representation>
        </AdaptationSet>
    </Period>
</MPD>
```

It can be understood that, the foregoing several scenarios are merely scenarios used as examples. Application scenarios of the technical solutions in the embodiments of the present application are not limited to the foregoing example scenarios though.

An embodiment of the present application further provides a related apparatus for implementing the foregoing solutions.

Referring to FIG. 4, an embodiment of the present application provides a client 400, which may include:

a first obtaining unit 410, configured to obtain a media presentation description file of a multi-stream multimedia streaming service i, where the media presentation description file of the multi-stream multimedia streaming service i describes N multimedia streams included in the multi-stream multimedia streaming service i, and N is an integer greater than 1;

a second obtaining unit 420, configured to obtain n1 multimedia streams of the N multimedia streams from a content server according to the media presentation description file of the multi-stream multimedia streaming service i; and a presentation unit 430, configured to present X presentation objects formed by the n1 multimedia streams; where the first obtaining unit 410 is further configured to: when a presentation object a of the X presentation objects is selected, obtain a media presentation description file of a multimedia streaming service j that has an association relationship with the presentation object a, where the media presentation description file of the multimedia streaming service j describes M multimedia streams included in the multimedia streaming service j, and M and X are positive integers; and the second obtaining unit 420 is further configured to obtain m1 multimedia streams of the M multimedia streams from the content server according to the media presentation description file of the multimedia streaming service j.

Optionally, in some possible implementations of the present application, the association relationship between the presentation object a and the multimedia streaming service j is described by a description element, corresponding to the presentation object a, in the media presentation description file of the multi-stream multimedia streaming service i.

Optionally, in some possible implementations of the present application, the association relationship between the presentation object a and the multimedia streaming service j is described by an AdaptationSet element, corresponding to the presentation object a, in the media presentation description file of the multi-stream multimedia streaming service i; or the association relationship between the presentation object a and the multimedia streaming service j is described by a Representation Representation element, corresponding to the presentation object a, in the media presentation description file of the multi-stream multimedia streaming service i; or the association relationship between the presentation object a and the multimedia streaming service j is described by a SubRepresentation element, corresponding to the presentation object a, in the media presentation description file of the multi-stream multimedia streaming service i.

Optionally, in some possible implementations of the present application, the association relationship between the presentation object a and the multimedia streaming service j is described by an association description element or an association description attribute in the AdaptationSet element, corresponding to the presentation object a, in the media presentation description file of the multi-stream multimedia streaming service i; or the association relationship between the presentation object a and the multimedia streaming service j is described by an association description element or an association description attribute in the Representation element, corresponding to the presentation object a, in the media presentation description file of the multi-stream multimedia streaming service i; or the association relationship between the presentation object a and the multimedia streaming service j is described by an association description element or an association description attribute in the SubRepresentation element, corresponding to the presentation object a, in the media presentation description file of the multi-stream multimedia streaming service i.

Optionally, in some possible implementations of the present application, the association description element or the association description attribute describes the association relationship between the presentation object a and the multimedia streaming service j by describing an association relationship between the presentation object a and the media presentation description file of the multimedia streaming service j.

Optionally, in some possible implementations of the present application, the association description element includes an attribute that carries an identifier of the media presentation description file of the multimedia streaming service j, or the association attribute carries an identifier of the media presentation description file of the multimedia streaming service j.

Optionally, in some possible implementations of the present application, the association description element is an XLink element or the association description attribute is an XLink attribute.

Optionally, in some possible implementations of the present application, the presentation unit 430 is further configured to present the m1 multimedia streams; and the description element, corresponding to the presentation object a, in the media presentation description file of the multi-stream multimedia streaming service i includes a continuity indication element or a continuity indication attribute; and when the continuity indication element or the continuity indication attribute indicates that presentation is performed in a manner of keeping temporal continuity, temporal continuity is kept between presentation of the m1 multimedia streams by the presentation unit and presentation of the presentation object a by the presentation unit.

Optionally, in some possible implementations of the present application, when the continuity indication element or the continuity indication attribute indicates that presentation is performed in a manner of keeping temporal continuity, the presentation unit presents the m1 multimedia streams from a start time point that is a time point when the presentation object a is selected.

Optionally, in some possible implementations of the present application, when the continuity indication element or the continuity indication attribute indicates that presentation is performed in a manner of keeping temporal continuity, the presentation unit presents the m1 multimedia streams from a start time point that is a time point when presentation of the presentation object a is stopped.

Optionally, in some possible implementations of the present application, the continuity indication element is an XLink element or an extension element, or the continuity indication attribute is an XLink attribute or an extension attribute.

Optionally, in some possible implementations of the present application, a show attribute of the XLink element indicates that presentation is performed in a manner of keeping temporal continuity.

Optionally, in some possible implementations of the present application, an extension attribute continuation of the XLink element indicates that presentation is performed in a manner of keeping temporal continuity.

Optionally, in some possible implementations of the present application, the extension attribute xlinkContinuation indicates that presentation is performed in a manner of keeping temporal continuity.

Optionally, in some possible implementations of the present application, the description element, corresponding to the presentation object a, in the media presentation description file of the multi-stream multimedia streaming service i describes an association relationship between at least two multimedia streams associated with the presentation object a. The at least two multimedia streams associated with the presentation object a are multimedia streams of the N multimedia streams.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and an adaptation set of the multimedia stream q.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a representation of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a sub-representation of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a representation of the multimedia stream p and a representation of the multimedia stream p.

Optionally, in some possible implementations of the present application, the association relationship between the at least two multimedia streams is described by the AdaptationSet element, corresponding to the presentation object a, in the media presentation description file of the multi-stream multimedia streaming service i; or the association relationship between the at least two multimedia streams is described by the Representation element, corresponding to the presentation object a, in the media presentation description file of the multi-stream multimedia streaming service i; or the association relationship between the at least two multimedia streams is described by the SubRepresentation element, corresponding to the presentation object a, in the media presentation description file of the multi-stream multimedia streaming service i.

Optionally, in some possible implementations of the present application, the association relationship between the at least two multimedia streams is described by an associationID element and an associationType element that are in the AdaptationSet AdaptationSet element, corresponding to the presentation object a, in the media presentation description file of the multi-stream multimedia streaming service i; or the association relationship between the at least two multimedia streams is described by an associationID element and an associationType attribute that are in the AdaptationSet element, corresponding to the presentation object a, in the media presentation description file of the multi-stream multimedia streaming service i; or the association relationship between the at least two multimedia streams is described by an associationID attribute and an associationType element that are in the AdaptationSet element, corresponding to the presentation object a, in the media presentation description file of the multi-stream multimedia streaming service i; or the association relationship between the at least two multimedia streams is described by an associationID attribute and an associationType attribute that are in the AdaptationSet element, corresponding to the presentation object a, in the media presentation description file of the multi-stream multimedia streaming service i; or the association relationship between the at least two multimedia streams is described by an associationID element and an associationType element that are in the Representation element, corresponding to the presentation object a, in the media presentation description file of the multi-stream multimedia streaming service i; or the association relationship between the at least two multimedia streams is described by an associationID element and an associationType attribute that are in the Representation element, corresponding to the presentation object a, in the media presentation description file of the multi-stream multimedia streaming service i; or the association relationship between the at least two multimedia streams is described by an associationID attribute and an associationType element that are in the Representation element, corresponding to the presentation object a, in the media presentation description file of the multi-stream multimedia streaming service i; or the association relationship between the at least two multimedia streams is described by an associationID attribute and an associationType attribute that are in the Representation element, corresponding to the presentation object a, in the media presentation description file of the multi-stream multimedia streaming service i; or the association relationship between the at least two multimedia streams is described by an associationID element and an associationType element that are in the SubRepresentation element, corresponding to the presentation object a, in the media presentation description file of the multi-stream multimedia streaming service i; or the association relationship between the at least two multimedia streams is described by an associationID element and an associationType attribute that are in the SubRepresentation element, corresponding to the presentation object a, in the media presentation description file of the multi-stream multimedia streaming service i; or the association relationship between the at least two multimedia streams is described by an associationID attribute and an associationType element that are in the SubRepresentation element, corresponding to the presentation object a, in the media presentation description file of the multi-stream multimedia streaming service i; or the association relationship between the at least two multimedia streams is described by an associationID attribute and an associationType attribute that are in the SubRepresentation element, corresponding to the presentation object a, in the media presentation description file of the multi-stream multimedia streaming service i.

It can be understood that, functions of the functional modules of the client 400 in this embodiment may be specifically implemented according to the methods in the foregoing method embodiments. For specific implementation processes, reference may be made to related descriptions in the foregoing method embodiments. Details are not described herein again. The client 400 may be configured to implement any multimedia streaming service presentation method based on Hypertext Transfer Protocol streaming provided in the foregoing embodiments.

The client 400 may be a DASH client or another client that incorporates a logical function of a DASH client.

The client 400 may be, for example, a personal computer, a mobile phone, a tablet computer, a television set, or a set top box.

It can be learnt that, in the technical solution in this embodiment, the media presentation description file of the multi-stream multimedia streaming service i and the media presentation description file of the multimedia streaming service j are two different media presentation description files. This means that different multimedia streaming services each have a corresponding media presentation description file. The association relationship between the presentation object a and the multimedia streaming service j is introduced, which means that some level of association relationship between a multi-stream multimedia streaming service and another multimedia streaming service is introduced. Therefore, when the presentation object a of the X presentation objects is selected, the client 400 can obtain the media presentation description file of the multimedia streaming service j that has an association relationship with the presentation object a, and the client 400 can further obtain, from the content server according to the media presentation description file of the multimedia streaming service j, m1 multimedia streams of the M multimedia streams included in the multimedia streaming service j and present the m1 multimedia streams. It is obvious that the foregoing technical solution helps better implement flexible switching between a multi-stream multimedia streaming service and another multimedia streaming service, and therefore helps improve user experience of an interactive multimedia streaming service.

Figure 5:
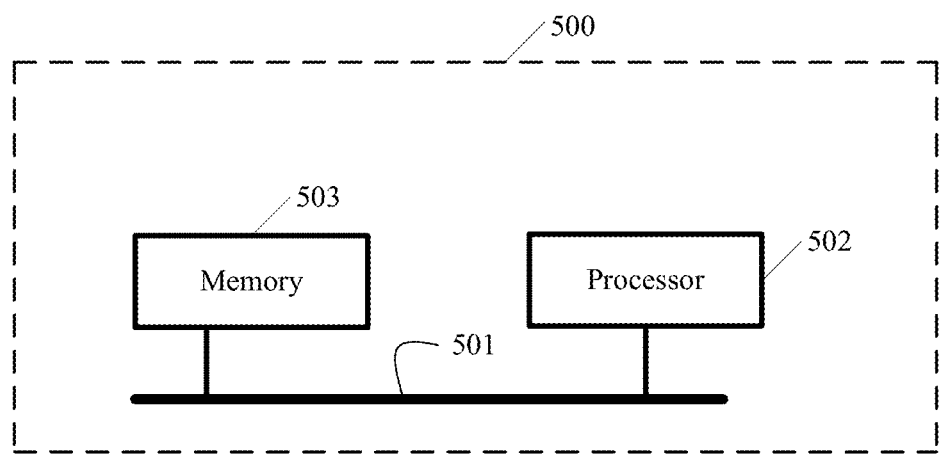
FIG. 5 is a schematic diagram of another client according to an embodiment of the present application.

Referring to FIG. 5, a client 500 provided in an embodiment of the present application may include:

a processor 502 and a memory 503, where the processor 502 and the memory 503 are coupled by using a bus 501.

The processor 502 invokes code or an instruction in the memory 503 to: obtain a media presentation description file of a multi-stream multimedia streaming service i, where the media presentation description file of the multi-stream multimedia streaming service i describes N multimedia streams included in the multi-stream multimedia streaming service i, and N is an integer greater than 1; obtain n1 multimedia streams of the N multimedia streams from a content server according to the media presentation description file of the multi-stream multimedia streaming service i; present X presentation objects formed by the n1 multimedia streams; when a presentation object a of the X presentation objects is selected, obtain a media presentation description file of a multimedia streaming service j that has an association relationship with the presentation object a, where the media presentation description file of the multimedia streaming service j describes M multimedia streams included in the multimedia streaming service j, and M and X are positive integers; and obtain m1 multimedia streams of the M multimedia streams from the content server according to the media presentation description file of the multimedia streaming service j.

Optionally, in some possible implementations of the present application, the association relationship between the presentation object a and the multimedia streaming service j is described by a description element, corresponding to the presentation object a, in the media presentation description file of the multi-stream multimedia streaming service i.

Optionally, in some possible implementations of the present application, the association relationship between the presentation object a and the multimedia streaming service j is described by an AdaptationSet element, corresponding to the presentation object a, in the media presentation description file of the multi-stream multimedia streaming service i; or the association relationship between the presentation object a and the multimedia streaming service j is described by a Representation element, corresponding to the presentation object a, in the media presentation description file of the multi-stream multimedia streaming service i; or the association relationship between the presentation object a and the multimedia streaming service j is described by a SubRepresentation element, corresponding to the presentation object a, in the media presentation description file of the multi-stream multimedia streaming service i.

Optionally, in some possible implementations of the present application, the association relationship between the presentation object a and the multimedia streaming service j is described by an association description element or an association description attribute in the AdaptationSet element, corresponding to the presentation object a, in the media presentation description file of the multi-stream multimedia streaming service i; or the association relationship between the presentation object a and the multimedia streaming service j is described by an association description element or an association description attribute in the Representation element, corresponding to the presentation object a, in the media presentation description file of the multi-stream multimedia streaming service i; or the association relationship between the presentation object a and the multimedia streaming service j is described by an association description element or an association description attribute in the SubRepresentation element, corresponding to the presentation object a, in the media presentation description file of the multi-stream multimedia streaming service i.

Optionally, in some possible implementations of the present application, the association description element or the association description attribute describes the association relationship between the presentation object a and the multimedia streaming service j by describing an association relationship between the presentation object a and the media presentation description file of the multimedia streaming service j.

Optionally, in some possible implementations of the present application, the association description element includes an attribute that carries an identifier of the media presentation description file of the multimedia streaming service j, or the association attribute carries an identifier of the media presentation description file of the multimedia streaming service j.

Optionally, in some possible implementations of the present application, the association description element is an XLink element or the association description attribute is an XLink attribute.

Optionally, in some possible implementations of the present application, the processor is further configured to present the m1 multimedia streams; and the description element, corresponding to the presentation object a, in the media presentation description file of the multi-stream multimedia streaming service i includes a continuity indication element or a continuity indication attribute; and when the continuity indication element or the continuity indication attribute indicates that presentation is performed in a manner of keeping temporal continuity, temporal continuity is kept between presentation of the m1 multimedia streams by the processor and presentation of the presentation object a by the presentation unit.

Optionally, in some possible implementations of the present application, when the continuity indication element or the continuity indication attribute indicates that presentation is performed in a manner of keeping temporal continuity, the processor presents the m1 multimedia streams from a start time point that is a time point when the presentation object a is selected.

Optionally, in some possible implementations of the present application, when the continuity indication element or the continuity indication attribute indicates that presentation is performed in a manner of keeping temporal continuity, the processor presents the m1 multimedia streams from a start time point that is a time point when presentation of the presentation object a is stopped.

Optionally, in some possible implementations of the present application, the continuity indication element is an XLink element or an extension element, or the continuity indication attribute is an XLink attribute or an extension attribute.

Optionally, in some possible implementations of the present application, a show attribute of the XLink element indicates that presentation is performed in a manner of keeping temporal continuity.

Optionally, in some possible implementations of the present application, an extension attribute continuation of the XLink element indicates that presentation is performed in a manner of keeping temporal continuity.

Optionally, in some possible implementations of the present application, the extension attribute xlinkContinuation indicates that presentation is performed in a manner of keeping temporal continuity.

Optionally, in some possible implementations of the present application, the description element, corresponding to the presentation object a, in the media presentation description file of the multi-stream multimedia streaming service i describes an association relationship between at least two multimedia streams associated with the presentation object a. The at least two multimedia streams associated with the presentation object a are multimedia streams of the N multimedia streams.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and an adaptation set of the multimedia stream q.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between an adaptation set of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a representation of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a sub-representation of the multimedia stream p and a sub-representation of the multimedia stream p.

Optionally, in some possible implementations of the present application, the at least two multimedia streams associated with the presentation object a include a multimedia stream p and a multimedia stream q, and the description element, corresponding to the presentation object a, in the media presentation description file of the multi-stream multimedia streaming service i describes an association relationship between the multimedia stream p and the multimedia stream q by describing an association relationship between a representation of the multimedia stream p and a representation of the multimedia stream p.

Optionally, in some possible implementations of the present application, the association relationship between the at least two multimedia streams is described by the AdaptationSet element, corresponding to the presentation object a, in the media presentation description file of the multi-stream multimedia streaming service i; or the association relationship between the at least two multimedia streams is described by the Representation element, corresponding to the presentation object a, in the media presentation description file of the multi-stream multimedia streaming service i; or the association relationship between the at least two multimedia streams is described by the SubRepresentation element, corresponding to the presentation object a, in the media presentation description file of the multi-stream multimedia streaming service i.

Optionally, in some possible implementations of the present application, the association relationship between the at least two multimedia streams is described by an associationID element and an associationType element that are in the AdaptationSet element, corresponding to the presentation object a, in the media presentation description file of the multi-stream multimedia streaming service i; or the association relationship between the at least two multimedia streams is described by an associationID element and an associationType attribute that are in the AdaptationSet element, corresponding to the presentation object a, in the media presentation description file of the multi-stream multimedia streaming service i; or the association relationship between the at least two multimedia streams is described by an associationID attribute and an associationType element that are in the AdaptationSet element, corresponding to the presentation object a, in the media presentation description file of the multi-stream multimedia streaming service i; or the association relationship between the at least two multimedia streams is described by an associationID attribute and an associationType attribute that are in the AdaptationSet element, corresponding to the presentation object a, in the media presentation description file of the multi-stream multimedia streaming service i; or the association relationship between the at least two multimedia streams is described by an associationID element and an associationType element that are in the Representation element, corresponding to the presentation object a, in the media presentation description file of the multi-stream multimedia streaming service i; or the association relationship between the at least two multimedia streams is described by an associationID element and an associationType attribute that are in the Representation element, corresponding to the presentation object a, in the media presentation description file of the multi-stream multimedia streaming service i; or the association relationship between the at least two multimedia streams is described by an associationID attribute and an associationType element that are in the Representation element, corresponding to the presentation object a, in the media presentation description file of the multi-stream multimedia streaming service i; or the association relationship between the at least two multimedia streams is described by an associationID attribute and an associationType attribute that are in the Representation element, corresponding to the presentation object a, in the media presentation description file of the multi-stream multimedia streaming service i; or the association relationship between the at least two multimedia streams is described by an associationID element and an associationType element that are in the Sub-Representation element, corresponding to the presentation object a, in the media presentation description file of the multi-stream multimedia streaming service i; or the association relationship between the at least two multimedia streams is described by an associationID element and an associationType attribute that are in the Sub-Representation n element, corresponding to the presentation object a, in the media presentation description file of the multi-stream multimedia streaming service i; or the association relationship between the at least two multimedia streams is described by an associationID attribute and an associationType element that are in the Sub-Representation element, corresponding to the presentation object a, in the media presentation description file of the multi-stream multimedia streaming service i; or the association relationship between the at least two multimedia streams is described by an associationID attribute and an associationType attribute that are in the Sub-Representation element, corresponding to the presentation object a, in the media presentation description file of the multi-stream multimedia streaming service i.

It can be understood that, functions of the functional modules of the client 500 in this embodiment may be specifically implemented according to the methods in the foregoing method embodiments. For specific implementation processes, reference may be made to related descriptions in the foregoing method embodiments. Details are not described herein again. The client 500 may be configured to implement any multimedia streaming service presentation method based on Hypertext Transfer Protocol streaming provided in the foregoing embodiments.

The client 500 may be a DASH client or another client that incorporates a logical function of a DASH client.

The client 500 may be, for example, a personal computer, a mobile phone, a tablet computer, a television set, or a set top box.

It can be learnt that, in the technical solution in this embodiment, the media presentation description file of the multi-stream multimedia streaming service i and the media presentation description file of the multimedia streaming service j are two different media presentation description files. This means that different multimedia streaming services each have a corresponding media presentation description file. The association relationship between the presentation object a and the multimedia streaming service j is introduced, which means that some level of association relationship between a multi-stream multimedia streaming service and another multimedia streaming service is introduced. Therefore, when the presentation object a of the X presentation objects is selected, the client 500 can obtain the media presentation description file of the multimedia streaming service j that has an association relationship with the presentation object a, and the client 500 can further obtain, from the content server according to the media presentation description file of the multimedia streaming service j, m1 multimedia streams of the M multimedia streams included in the multimedia streaming service j and present the m1 multimedia streams. It is obvious that the foregoing technical solution helps better implement flexible switching between a multi-stream multimedia streaming service and another multimedia streaming service, and therefore helps improve user experience of an interactive multimedia streaming service.

Figure 6:
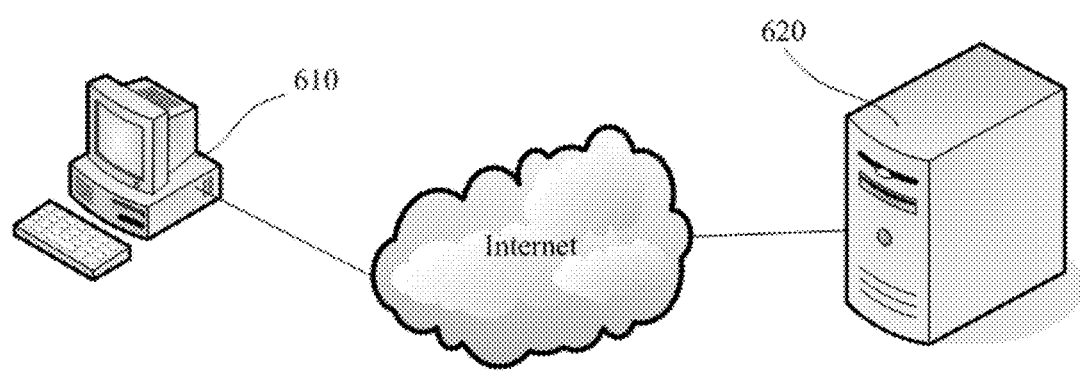
FIG. 6 is a schematic diagram of a communications system according to an embodiment of the present application.

Referring to FIG. 6, an embodiment of the present application further provides a communications system, including a client 610 and a content server 620 that is communicatively connected to the client 610. The client 610 may be, for example, any client according to the foregoing embodiments.

A multimedia stream mentioned in the embodiments of the present application may be a data bitstream in a multimedia streaming service. The multimedia stream may include different media types, for example, an audio stream, a video stream, and a text stream.

A multi-stream multimedia streaming service mentioned in the embodiments of the present application may be a multimedia streaming service that may include multiple presentation objects.

A presentation object mentioned in the embodiments of the present application may be a media presentation that can present integrated logic and that is formed by at least one multimedia stream and/or a part of at least one multimedia stream (for example, may be formed by one video stream, formed by one video stream and one audio stream, formed by one video stream and one subtitle stream, or formed by one video stream, one audio stream, and one subtitle stream; for example, may be formed by a part of one video stream, formed by one audio stream and a part of one video stream, formed by one subtitle stream and a part of one video stream, or formed by one audio stream, one subtitle stream, and a part of one video stream).

A content server mentioned in the embodiments of the present application is a server that can provide a multimedia stream. The content server may be, for example, a BM-SC & HTTP server or a PSS server & HTTP server.

An embodiment of the present application further provides a computer storage medium. The computer storage medium may store a program. When the program is executed, some or all of the steps of any method described in the foregoing method embodiments are performed.

In the foregoing embodiments, the descriptions of the embodiments have respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiments are merely examples. For example, the unit division is merely logical function division and may be other division in actual implementation. For example, multiple units or components may be combined or integrated into another system, or some features may be ignored or not performed. In addition, the displayed or discussed mutual couplings, or direct couplings, or communication connections may be indirect couplings or communication connections through some interfaces, apparatuses or units, and may be implemented in electrical or other forms.

The units described as separate parts may or may not be physically separate. Parts displayed as units may or may not be physical units, and may be located in one position or distributed on multiple network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, or a network device, and may specifically be a processor in a computer device) to perform all or some of the steps of the foregoing methods described in the embodiments of the present application. The foregoing storage medium may include: any medium that can store program code, such as a USB flash drive, a removable hard disk, a magnetic disk, an optical disc, a read-only memory (ROM), or a random access memory (RAM).

The foregoing embodiments are merely intended to describe the technical solutions of the present application, but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A multimedia streaming service presentation method based on Hypertext Transfer Protocol (HTTP) streaming, wherein the method comprises:

obtaining, by a client, a first media presentation description file of a first multi-stream multimedia streaming service i, wherein the first media presentation description file describes N multimedia streams comprised in the first multi-stream multimedia streaming service i, and wherein N is an integer greater than one;

obtaining, by the client, n1 multimedia streams of the N multimedia streams from a content server according to the first media presentation description file of the first multi-stream multimedia streaming service i, wherein n1 is an integer less than or equal to N;

presenting, by the client, X presentation objects formed by the n1 multimedia streams, wherein X is an integer less than, greater than, or equal to n1;

when a presentation object a of the X presentation objects is selected, obtaining, by the client, a second media presentation description file of a second multi-stream multimedia streaming service j that has an association relationship with the presentation object a, wherein the second media presentation description file of the second multi-stream multimedia streaming service j describes M multimedia streams comprised in the second multi-stream multimedia streaming service j, wherein M and X are positive integers, wherein the association relationship between the presentation object a and the second multi-stream multimedia streaming service j is described by a description element, corresponding to the presentation object a, in the first media presentation description file of the first multi-stream multimedia streaming service i, and wherein the description element comprises a continuity indication element or a continuity indication attribute;

obtaining, by the client, m1 multimedia streams of the M multimedia streams from the content server according to the second media presentation description file of the second multi-stream multimedia streaming service j, wherein m1 is an integer less than or equal to M;

presenting, by the client, the m1 multimedia streams; and presenting, by the client, the m1 multimedia streams from a start time point that is a time point when the presentation object a is selected or stopped when the continuity indication element or the continuity indication attribute indicates that presentation is performed in a manner of maintaining temporal continuity, wherein the temporal continuity is maintained between presentation of the m1 multimedia streams by the client and presentation of the presentation object a by the client.

2. The multimedia streaming service presentation method of claim 1, wherein the association relationship between the presentation object a and the second multi-stream multimedia streaming service j is described by at least one of:

an AdaptationSet element, corresponding to the presentation object a, in the first media presentation description file of the first multi-stream multimedia streaming service i;

a Representation element, corresponding to the presentation object a, in the first media presentation description file of the first multi-stream multimedia streaming service i; or a SubRepresentation element, corresponding to the presentation object a, in the first media presentation description file of the first multi-stream multimedia streaming service i.

3. The multimedia streaming service presentation method of claim 2, wherein the association relationship between the presentation object a and the second multi-stream multimedia streaming service j is described by at least one of:

an association description element or an association description attribute in the AdaptationSet element, corresponding to the presentation object a, in the first media presentation description file of the first multi-stream multimedia streaming service i;

an association description element or an association description attribute in the Representation element, corresponding to the presentation object a, in the first media presentation description file of the first multi-stream multimedia streaming service i; or an association description element or an association description attribute in the SubRepresentation element, corresponding to the presentation object a, in the first media presentation description file of the first multi-stream multimedia streaming service i.

4. The multimedia streaming service presentation method of claim 3, wherein the association description element or the association description attribute describes the association relationship between the presentation object a and the second multi-stream multimedia streaming service j by describing an association relationship between the presentation object a and the second media presentation description file of the second multi-stream multimedia streaming service j.

5. The multimedia streaming service presentation method of claim 4, wherein the association description element comprises an attribute that carries an identifier of the second multi-stream media presentation description file of the second multi-stream multimedia streaming service j, or the association description attribute carries an identifier of the first media presentation description file of the second multimedia streaming service j.

6. The multimedia streaming service presentation method of claim 3, wherein the association description element is an XLink element or the association description attribute is an XLink attribute.

7. The multimedia streaming service presentation method of claim 3, wherein the association description element is an extension element or an extension attribute.

8. The multimedia streaming service presentation method of claim 3, wherein the association between the presentation object a and the multimedia streaming service j is described an associationID attribute and an associationType attribute comprised in the AdaptationSet element, corresponding to the presentation object a, in the media presentation description file of the multi-stream multimedia streaming service i.

9. The multimedia streaming service presentation method of claim 8, wherein the associationID attribute and the associationType attribute comprised in the AdaptationSet element indicate an association between each audio stream and each thumbnail.

10. The multimedia streaming service presentation method of claim 1, wherein the association relationship between the presentation object a and the multimedia streaming service j is described by an extension element, corresponding to the presentation object a, in the media presentation description file of the multi-stream multimedia streaming service i.

11. A client, comprising:
a memory comprising code; and
a processor configured to invoke the code which, when executed by the processor, causes the processor to be configured to:
obtain a first media presentation description file of a first multi-stream multimedia streaming service i, wherein the first media presentation description file of the first multi-stream multimedia streaming service i describes N multimedia streams comprised in the first multi-stream multimedia streaming service i, and wherein N is an integer greater than one;

obtain n1 multimedia streams of the N multimedia streams from a content server according to the media presentation description file of the first multi-stream multimedia streaming service i, wherein n1 is an integer less than or equal to N;

present X presentation objects formed by the n1 multimedia streams, wherein X is an integer less than, greater than, or equal to n1;

when a presentation object a of the X presentation objects is selected, obtain a second media presentation description file of a second multi-stream multimedia streaming service j that has an association relationship with the presentation object a, wherein the second media presentation description file of the second multi-stream multimedia streaming service j describes M multimedia streams comprised in the second multi-stream multimedia streaming service j, wherein M and X are positive integers, wherein the association relationship between the presentation object a and the second multi-stream multimedia streaming service j is described by a description element, corresponding to the presentation object a, in the first media presentation description file of the first multi-stream multimedia streaming service i, and wherein the description element comprises a continuity indication element or a continuity indication attribute;

obtain m1 multimedia streams of the M multimedia streams from the content server according to the second multi-stream media presentation description file of the second multimedia streaming service j, wherein m1 is an integer less than or equal to M;

present, the m1 multimedia streams; and present, by the client, the m1 multimedia streams from a start time point that is a time point when the presentation object a is selected or stopped when the continuity indication element or the continuity indication attribute indicates that presentation is performed in a manner of maintaining temporal continuity, wherein the temporal continuity is maintained between presentation of the m1 multimedia streams by the client and presentation of the presentation object a by the client.

12. The client of claim 11, wherein the association relationship between the presentation object a and the multimedia streaming service j is described by at least one of:

an AdaptationSet element, corresponding to the presentation object a, in the first media presentation description file of the first multi-stream multimedia streaming service i;

a Representation element, corresponding to the presentation object a, in the first media presentation description file of the first multi-stream multimedia streaming service i; or a SubRepresentation element, corresponding to the presentation object a, in the first media presentation description file of the first multi-stream multimedia streaming service i.

13. The client of claim 12, wherein the association relationship between the presentation object a and the second multi-stream multimedia streaming service j is described by at least one of:

an association description element or an association description attribute in the AdaptationSet element, corresponding to the presentation object a, in the first media presentation description file of the first multi-stream multimedia streaming service i;

an association description element or an association description attribute in the Representation element, corresponding to the presentation object a, in the first media presentation description file of the first multi-stream multimedia streaming service i; or an association description element or an association description attribute in the SubRepresentation element, corresponding to the presentation object a, in the first media presentation description file of the first multi-stream multimedia streaming service i.

14. The client of claim 13, wherein the association description element or the association description attribute describes the association relationship between the presentation object a and the second multi-stream multimedia streaming service j by describing an association relationship between the presentation object a and the second media presentation description file of the second multi-stream multimedia streaming service j.

15. The client of claim 14, wherein the association description element comprises an attribute that carries an identifier of the second media presentation description file of the second multi-stream multimedia streaming service j, or the association description attribute carries an identifier of the media presentation description file of the second multi-stream multimedia streaming service j.

16. The client of claim 13, wherein the association description element is an XLink element or the association description attribute is an XLink attribute.

17. The client of claim 13, wherein the association description element is an extension element or an extension attribute.

18. The client of claim 13, wherein the association between the presentation object a and the multimedia streaming service j is described an associationID attribute and an associationType attribute comprised in the AdaptationSet element, corresponding to the presentation object a, in the media presentation description file of the multi-stream multimedia streaming service i.

19. The multimedia streaming service presentation method of claim 18, wherein the associationID attribute and the associationType attribute comprised in the AdaptationSet element indicate an association between each audio stream and each thumbnail.

20. The client of claim 11, wherein the association relationship between the presentation object a and the multimedia streaming service j is described by an extension element, corresponding to the presentation object a, in the media presentation description file of the multi-stream multimedia streaming service i.

* * * * *